US008762680B2

(12) United States Patent
Arndt et al.

(10) Patent No.: US 8,762,680 B2
(45) Date of Patent: Jun. 24, 2014

(54) SCALING ENERGY USE IN A VIRTUALIZED ENVIRONMENT

(75) Inventors: Richard Loise Arndt, Austin, TX (US); Randal Craig Swanberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/358,636

(22) Filed: Jan. 26, 2012

(65) Prior Publication Data

US 2013/0198484 A1 Aug. 1, 2013

Related U.S. Application Data

(62) Division of application No. 12/468,104, filed on May 19, 2009, now Pat. No. 8,356,193.

(51) Int. Cl.
*G06F 12/00* (2006.01)
*G06F 9/50* (2006.01)

(52) U.S. Cl.
CPC .................................. *G06F 9/5077* (2013.01)
USPC .............. 711/173; 711/4; 711/112; 711/114; 711/158; 713/320; 713/324; 718/104

(58) Field of Classification Search
CPC .................................................... G06F 9/5077
USPC .............. 711/173, 4, 112, 114, 158; 713/320, 713/324; 718/104
See application file for complete search history.

(56) References Cited

U.S. PATENT DOCUMENTS

| 6,553,418 | B1 | 4/2003 | Collins et al. | |
| 6,957,435 | B2 * | 10/2005 | Armstrong et al. | 718/104 |
| 7,093,265 | B1 | 8/2006 | Jantz et al. | |
| 7,171,668 | B2 | 1/2007 | Molloy et al. | |
| 7,174,379 | B2 | 2/2007 | Agarwal et al. | |
| 8,020,164 | B2 * | 9/2011 | Barsness et al. | 718/104 |

(Continued)

FOREIGN PATENT DOCUMENTS

CN 101216874 A 1/2008

OTHER PUBLICATIONS

Balaji et al; "Analyzing the Impact of Supporting Out-of-Order Communication on In-order Performance with iWARP", SC07 Nov. 10-16, 2007, 1-12, Reno, Nevada, USA (c) 2007.

(Continued)

*Primary Examiner* — Stephen Elmore
(74) *Attorney, Agent, or Firm* — Garg Law Firm, PLLC; Rakesh Garg; Parashos Kalaitzis

(57) ABSTRACT

A set of physical input/output adapters (PIOAs) is configured such that each PIOAs in the set of PIOAs is a functional equivalent of another PIOAs in the set of PIOAs. A utilization of each PIOA in the set of PIOAs is measured. A number of PIOAs needed to service a workload is determined. A first subset of PIOAs from the set of PIOAs is powered down if the number of PIOAs needed to service the workload is smaller than a number of operational PIOAs. The I/O operations associated with the first subset of PIOAs are transferred to a second subset of PIOAs remaining operational in the set of PIOAs.

10 Claims, 16 Drawing Sheets

(56) References Cited

U.S. PATENT DOCUMENTS

| | | | |
|---|---|---|---|
| 8,127,165 B2* | 2/2012 | Qi et al. | 713/324 |
| 8,209,514 B2* | 6/2012 | Kisel et al. | 711/173 |
| 8,356,193 B2* | 1/2013 | Arndt et al. | 713/320 |
| 8,387,041 B2* | 2/2013 | Branda et al. | 718/1 |
| 2006/0168214 A1* | 7/2006 | Armstrong et al. | 709/225 |
| 2007/0192642 A1 | 8/2007 | Rothman et al. | |
| 2008/0052713 A1 | 2/2008 | Flemming et al. | |
| 2008/0077927 A1 | 3/2008 | Armstrong et al. | |
| 2008/0080544 A1* | 4/2008 | Mani et al. | 370/437 |
| 2008/0235684 A1 | 9/2008 | Anand et al. | |
| 2009/0007125 A1* | 1/2009 | Barsness et al. | 718/104 |
| 2009/0070769 A1* | 3/2009 | Kisel | 718/104 |
| 2010/0043005 A1* | 2/2010 | Ahuja et al. | 718/104 |
| 2013/0191840 A1* | 7/2013 | Barsness et al. | 718/104 |

OTHER PUBLICATIONS

Swaminathan and Chakrabarty, "Pruning-Based, Energy-Optimal, Deterministic I/O Device Scheduling for Hard Real-Time Systems", ACM Transactions on Embeded Computing Systems, Feb. 2005, pp. 141-167, vol. 4, No. 1, 1515 Broadway, New York, NY 10036 USA.

Havinga et al; "Energy-efficient wireless ATM design", Mobile Networks and Applications 5, 2000, 147-155, Baltzer Science Publishers BV, Department of Computer Science, University of Twente, 7500 AE Enschede, The Netherlands.

Stoess et al; "Energy Management for Hypervisor-Based Virtual Machines", 2007, 1-14, USENIX Association, USENIX Annual Technical Conference.

\* cited by examiner

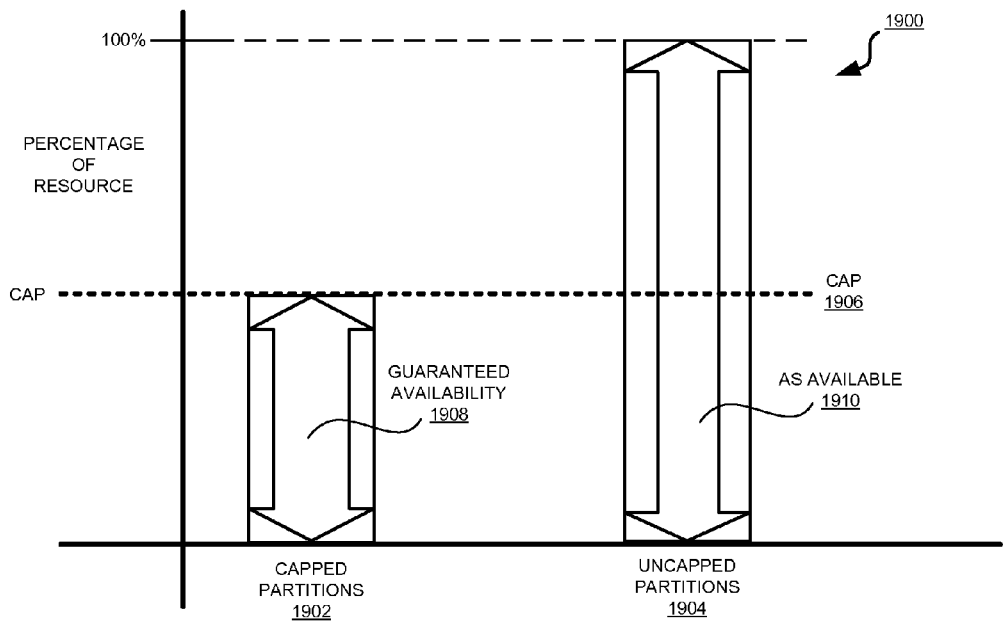
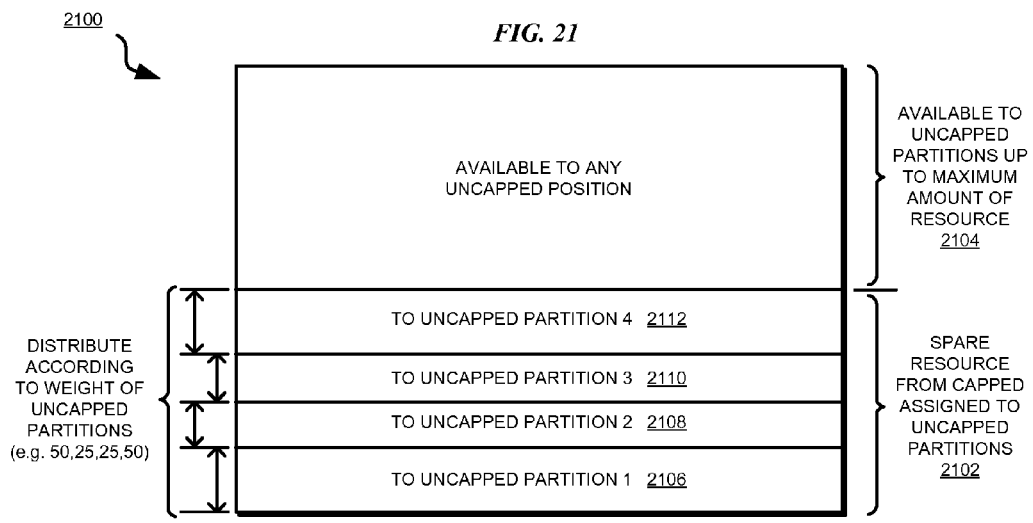

SCALING ENERGY USE IN A VIRTUALIZED ENVIRONMENT

BACKGROUND OF THE INVENTION

1. Field of the Invention

The present invention relates generally to an improved data processing system, and in particular, to a computer implemented method for modulating a resource for operating a data processing environment. Still more particularly, the present invention relates to a computer implemented method, system, and computer usable program code for scaling energy use in a virtualized data processing environment.

2. Description of the Related Art

Data processing systems can be divided into logical partitions (LPARs). Such data processing systems are also known as logical partitioned data processing systems. A logical partition is also known simply as a "partition". Each partition operates as a separate data processing system independent of the other partitions. Generally, a partition management firmware component connects the various partitions and provides the network connectivity among them. A Hypervisor is an example of such partition management firmware.

A partition or another commonly used data processing system may access one or more data storage devices for reading, writing, storing, and managing data. A partition may also access one or more data communication network devices (network) for sending and receiving data, such as from a data storage device. A network may be a local area network (LAN) or a wide area network (WAN).

In some partitioned data processing systems, virtual input/output (I/O) servers provide the partitions access to one or more network or data storage devices. A data storage device may include one or more physical data storage units, such as hard disks, as in the case of a storage array, or a storage area network (SAN).

A partition, with or without the use of a virtual I/O server may access a particular data storage device or a particular network over more than one data communication paths. Data communications conducted between a partition and a data storage device or a network over more than one data communication paths are called multipath I/O.

A partition utilizing multipath I/O may use multiple I/O adapters to communicate with the data storage device or network. Each I/O adapter may communicate with the data storage device over different data networks. Multipath I/O configurations are commonly employed in partitioned data processing system for increasing the data throughput rates between a partition and a data storage device or a remote data processing system. Multipath I/O configurations also improve the reliability of the data communications between a partition and a data storage device or a remote data processing system by providing redundant data communication paths between them.

SUMMARY OF THE INVENTION

The illustrative embodiments provide a method, system, and computer usable program product for scaling energy use in a virtualized data processing environment. According to the invention, an embodiment configures a set of PIOAs such that each PIOAs in the set of PIOAs is a functional equivalent of another PIOAs in the set of PIOAs. The embodiment measures a utilization of each PIOA in the set of PIOAs. The embodiment determines a number of PIOAs needed to service a workload. The embodiment powers down a first subset of PIOAs from the set of PIOAs if the number of PIOAs needed to service the workload is smaller than a number of operational PIOAs. The embodiment transfers the I/O operations associated with the first subset of PIOAs to a second subset of PIOAs remaining operational in the set of PIOAs.

Another embodiment further selects a first PIOA from the set of PIOAs to be in the first subset. Selecting the first PIOA is based on determining that transferring I/O operations from the first PIOA to a second PIOA will not cause a utilization of the second PIOA to exceed a threshold.

Another embodiment further remaps a VIOA mapped to the first PIOA to the second PIOA. Another embodiment deactivates a VIOA mapped to the first PIOA. The embodiment redistributes I/O operations associated with the first VIOA to a second VIOA.

In another embodiment, if the number of PIOAs needed to service the workload is greater than the number of operational PIOAs, the embodiment powers up a third subset of PIOAs from the set of PIOAs, the third subset comprising PIOAs that have been previously shut down. The embodiment redistributes the I/O operations associated with the second subset of PIOAs to a combination of the second and third subsets of PIOAs.

Another embodiment further selects a first PIOA from the set of PIOAs to be in the third subset. Selecting the first PIOA is based on determining that transferring an I/O operation from a second operational PIOA to the first PIOA is possible in a manner transparent to an application that is associated with the I/O operation.

Another embodiment further selects a VIOA to map to the first PIOA. The embodiment maps the selected VIOA mapped to the first PIOA.

Another embodiment further activates a VIOA associated with the first PIOA. The embodiment assigns I/O operations to the VIOA.

Another embodiment further selects an I/O drawer, the I/O drawer including a fourth subset of the PIOAs from the set of PIOAs. The embodiment determines whether the fourth subset is a subset of the first subset. The embodiment powers off all PIOAs in the fourth subset responsive to the fourth subset being a subset of the first subset. The embodiment powers off the I/O drawer.

In another embodiment, selecting the I/O drawer includes determining that powering off the I/O drawer will disrupt a communication with a I/O destination such that no other PIOAs in the set of PIOAs can take over the communication with the I/O destination without violating a utilization threshold.

In another embodiment, a first PIOA is a functional equivalent of a second PIOA if the first PIOA can service all I/O requests to all I/O destinations that are serviced by the second PIOA. In another embodiment, the workload is an existing work load, a forecasted workload, or a combination thereof.

According to the invention an embodiment for scaling energy use in a virtualized data processing environment dispatches a first amount of a resource to a set of capped partitions, a partition being a data processing system in the data processing environment. The embodiment computes a used portion of the first amount used in a first period. The embodiment forecasts a second amount of the resource needed for a second period. The forecasting is based on the used portion of the first amount, a workload performed by the set of capped partitions in the first period, or a combination thereof. The embodiment computes a spare portion of the first amount in the first period. The embodiment allocates the second amount to the set of capped partitions in the second period. The embodiment distributes a third amount of the resource to a set of uncapped partitions, the third amount being equal to the spare portion of the first amount.

In one embodiment, the distributing further includes allocating the third amount to a subset of the set of uncapped partitions according to a distribution criterion associated with each uncapped partition of the subset of the uncapped partitions. In another embodiment, the distribution criterion is a weight. In another embodiment the allocating the third amount to an uncapped partition in the subset further includes allocating a portion of the third amount for a portion of the second period.

Another embodiment allocates a fourth amount of the resource to the uncapped partitions in the set of uncapped partitions. The fourth amount is allocable to any uncapped partition in the set of uncapped partitions as needed by the uncapped partition during the second period.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 19 depicts a graph of a resource allocation in a partitioned data processing environment in which an illustrative embodiment can be implemented;

FIG. 21 depicts a graph of weighted allocation of spare resources in accordance with an illustrative embodiment.

DETAILED DESCRIPTION OF THE PREFERRED EMBODIMENT

Figure 1:
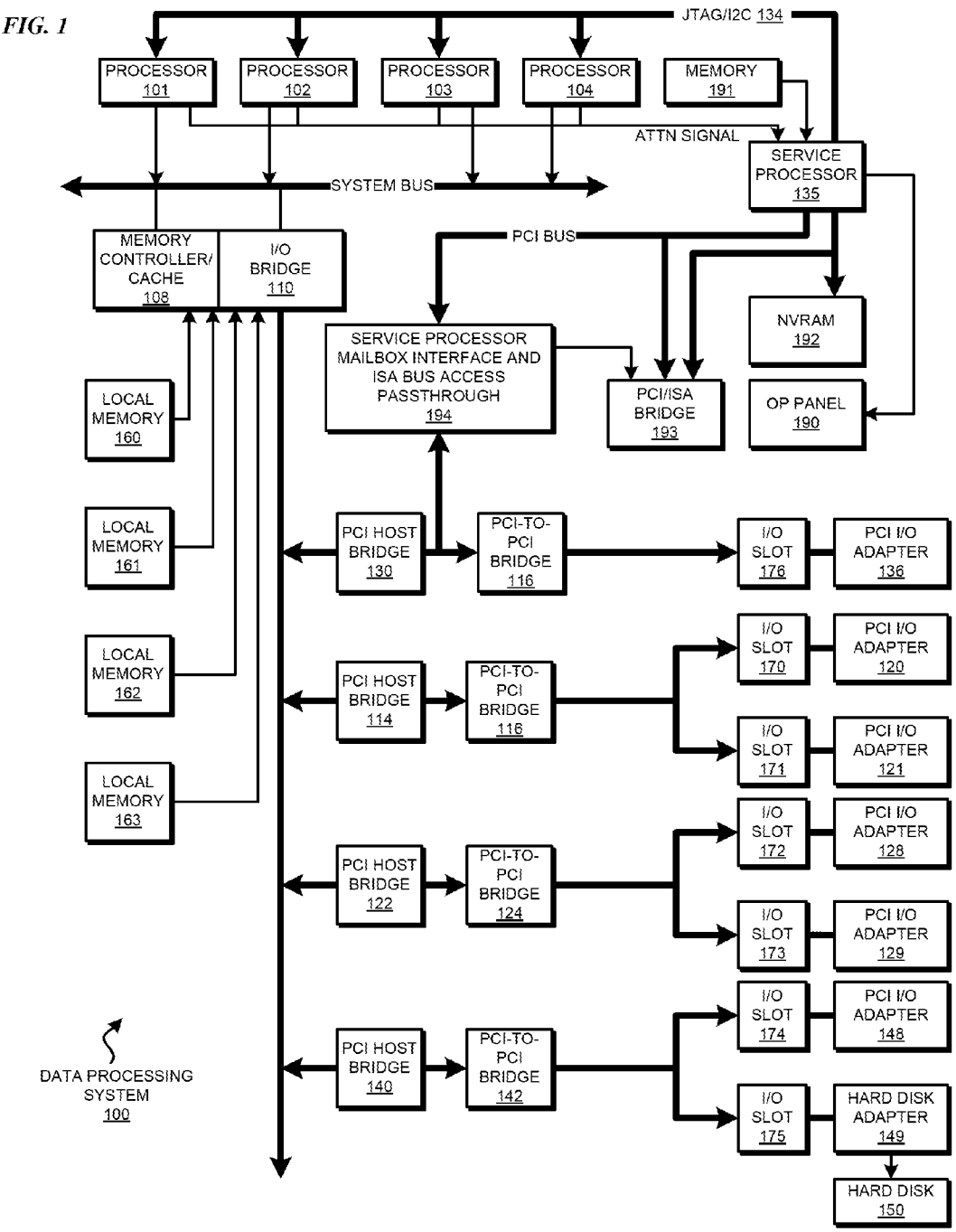
FIG. 1 depicts a block diagram of a data processing system in which the illustrative embodiments may be implemented is depicted.

Energy, often in the form of electrical energy, is consumed when data processing environments are operated to perform computing tasks. The invention recognizes that energy consumed by a computing environment is also a resource.

As is the case with other computing resource, a cost is associated with the energy resource as well. The invention recognizes that the cost of energy is a constraint in determining how to operate a data processing environment. For example, the capacity of electrical wiring may limit the amount of energy that can be transferred and consumed at a given time in a data processing environment. As another example, the maximum load capacity of an uninterruptible power supply (UPS) may pose a limit on how many computers and associated components should be operated at a time such that during a power outage the computing can progress uninterrupted using power from a UPS.

As another example, computers generate heat when operating and consuming energy. The total cooling capacity of a rack may limit how many computers or associated components may be operated simultaneously without overheating the computers. As another example, utility rates for electrical energy during peak consumption hours may be higher than the off peak rates. An operator may wish to limit the cost of energy during the peak hours by reducing the number of computing devices that may be operational in a data processing environment.

Therefore, the invention recognizes that just like any other computing resource, a need exists to measure energy resource's consumption, reduce the consumption, and allocate the resource such that the resource can be used in an efficient manner within the data processing environment. Furthermore, the invention recognizes that any reduction in energy consumption should not adversely affect the performance of the data processing environment. Additionally, the invention recognizes that any reduction or redistribution of the energy reduce should be transparent to the tasks being executed in the data processing environment.

The illustrative embodiments used to describe the invention address and solve the problem related to energy consumption in data processing environments. The illustrative embodiments provide a method, computer usable program product, and data processing system for scaling energy use in data processing environments generally, and particularly in virtualized data processing environments.

Using the illustrative embodiments, a data processing environment can reduce the total energy consumed in the data processing environment without adversely affecting the overall performance of the data processing environment. Furthermore, by using the illustrative embodiments, any scaling down or scaling up of the total energy consumption can be performed responsive to the computing needs of the data processing environment. Additionally, the scaling up or down of the energy consumed according to the illustrative embodiments can be transparent to the tasks executing in the data processing environment.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, data structures, designs, layouts, schematics, and tools only as examples and are not limiting on the illustrative embodiments. The illustrative embodiments may be implemented with respect to any type of data storage device or network.

Furthermore, the illustrative embodiments are described in some instances using particular software tools and data processing environments only as an example for the clarity of the description. The illustrative embodiments may be used in conjunction with other comparable or similarly purposed systems, applications, or architectures.

For example, some illustrative embodiments that are described in conjunction with virtualized logical partitioned environments can be used in conjunction with any data processing system where the illustrative embodiments can be implemented in the manner described within the scope of the invention. For example, an operation described with respect to a virtual device in this disclosure can be similarly implemented with respect to a real or physical device in certain data processing systems without departing the scope of the invention.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
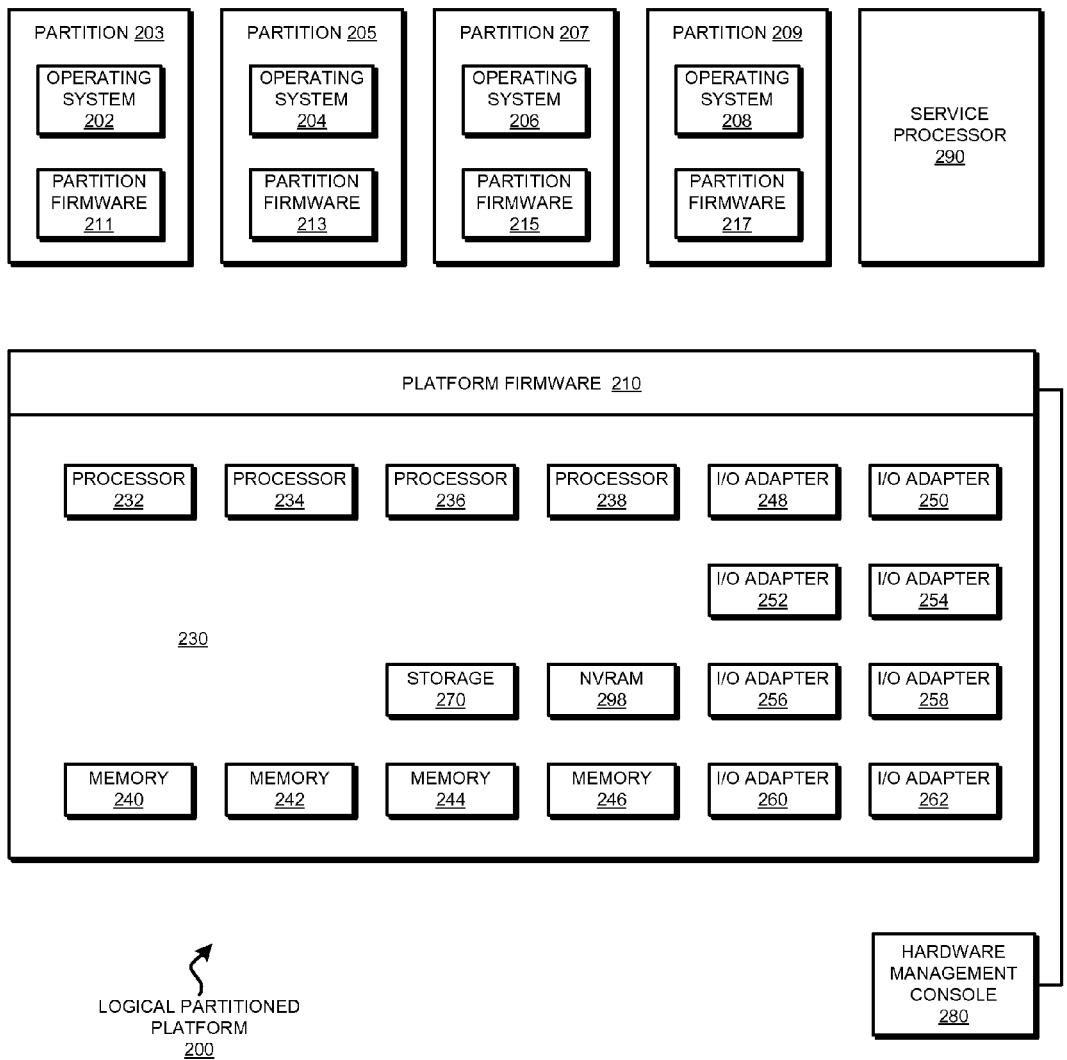
FIG. 2 depicts a block diagram of an example logical partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIM operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using IBM-i, which are designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

In a virtualized data processing environment, such as a partition, physical I/O adapters (PIOAs) are often accessed and utilized through virtual I/O adapters (VIOAs). As an example, PCI I/O adapters 136, 120, 121, 128, 129, and 148, and hard disk adapter 149 in FIG. 1, or I/O adapter 248, 250, 252, 254, 256, 258, 260, and 262 in FIG. 2 are each an example of a PIOA.

A VIOA is a logical construct that behaves like a PIOA such that an application or a component of a data processing system can use the VIOA in a manner similar to a PIOA. Furthermore, a VIOA may correspond to one or more PIOAs in a given configuration.

A virtual I/O server is a component of a data processing system that manages VIOAs and provides applications and other components of the data processing system access to the VIOAs. A Virtual I/O server may be implemented as hardware component, software component, or a combination thereof.

An I/O drawer is a configuration of one or more PIOA that can be added or removed from a data processing system as a whole. For example, an I/O drawer may be circuit board or a card that may include a set of PIOAs. A set of PIOAs is one or more PIOA. The card can be inserted in a data processing system thereby providing to the data processing system the set of PIOAs.

An I/O drawer itself consumes some energy when operational, whether or not a PIOA included in the I/O drawer is operational and consuming energy. A virtual I/O server may manage VIOAs that correspond to the PIOAs in the I/O drawers.

Figure 3:
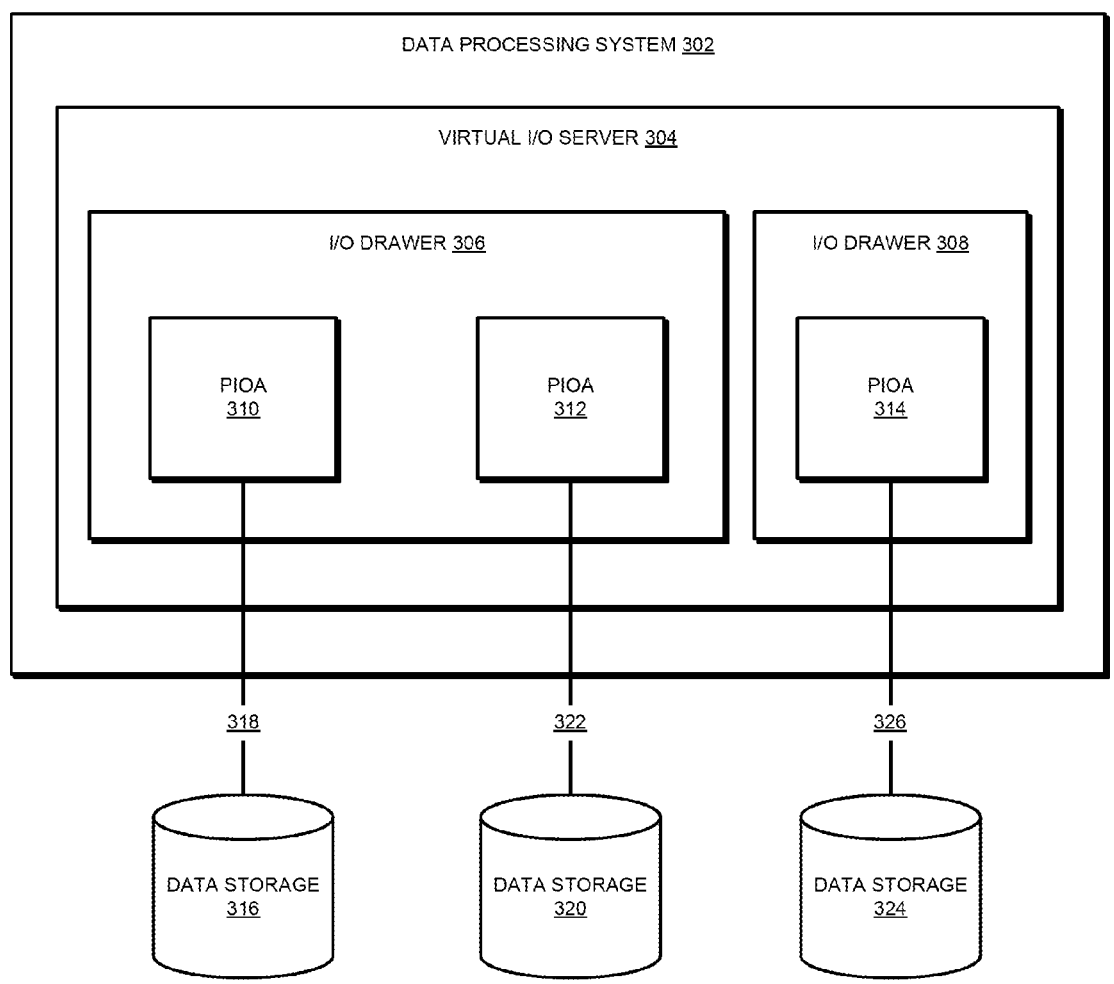
FIG. 3 depicts a block diagram of a configuration of a data processing environment in which the illustrative embodiments can be implemented.

With reference to FIG. 3, this figure depicts a block diagram of a configuration of a data processing environment in which the illustrative embodiments can be implemented. Data processing system 302 may be implemented using data processing system 100 in FIG. 1 or another comparable data processing system.

Virtual I/O server 304 may be a virtual I/O server operating within data processing system 302. Virtual I/O server 304 may manage one or more I/O drawers, such as I/O drawers 306 and 308.

I/O drawer 306, as an example, may include multiple PIOAs, such as PIOA 310 and PIOA 312, and other components. I/O drawer 308 may similarly include PIOA 314 and other components.

PIOA 310 may allow data communications with data storage device 316 over network 318. PIOA 312 may allow data communications with data storage device 320 over network 322. PIOA 314 may allow data communications with data storage device 324 over network 326. Data storage devices 316, 320, and 324 may be similar or different from one another. For example, data storage device 316 may be a local hard disk in data processing system 302 and data storage device 320 may be a remote mass data storage device. Networks 318, 322, and 326 may be same or different from one another. Network 318 may be a system bus or a LAN and network 322 may be a WAN.

Figure 4:
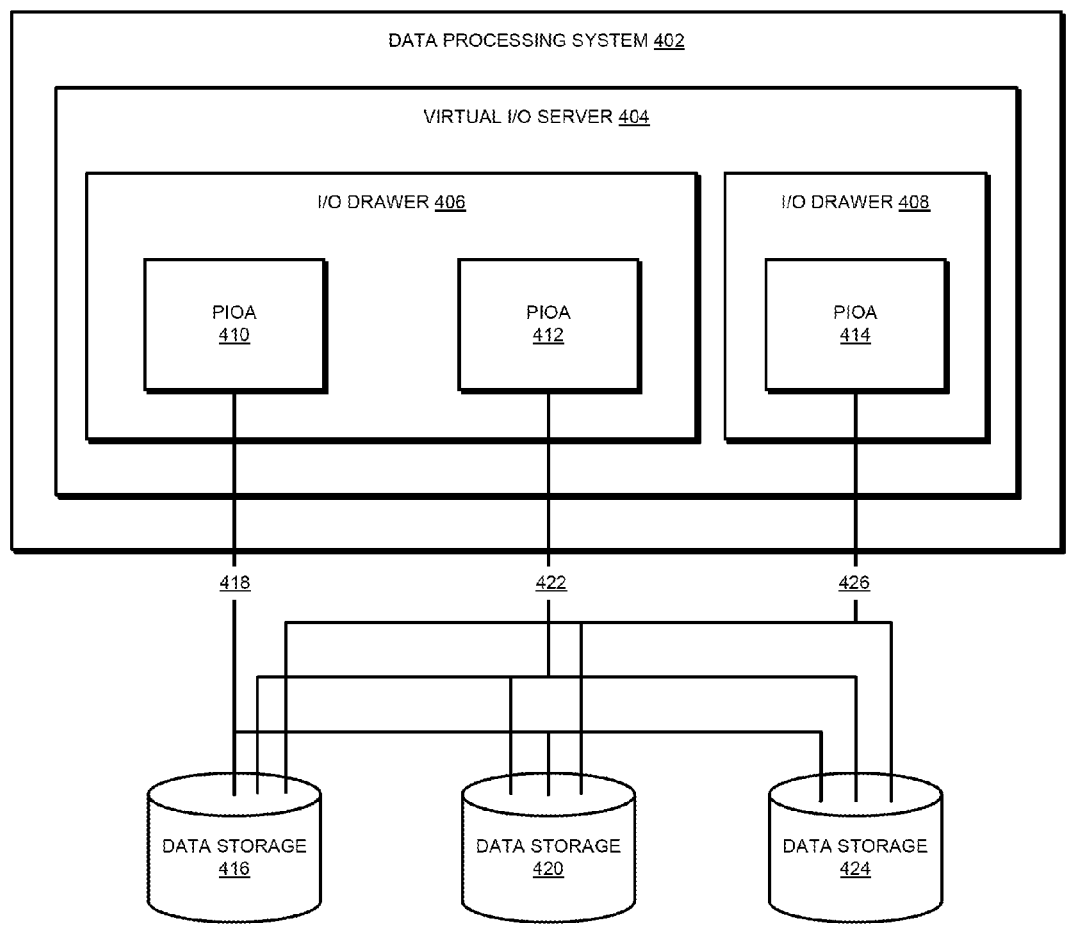
FIG. 4 depicts a block diagram of a data processing system configuration in accordance with an illustrative embodiment.

With reference to FIG. 4, this figure depicts a block diagram of a data processing system configuration in accordance with an illustrative embodiment. Data processing system 402 and the structures shown within may be similar to data processing system 302 and the structures shown within data processing system 302 in FIG. 3. Data storage devices 416, 420, and 424 may be similar to data storage devices 316, 320, and 324 respectively in FIG. 3.

PIOAs 410, 412, and 414 are configured in accordance with the illustrative embodiment to enable data communication with all possible data storage devices. In this figure, PIOA 410 is shown to be facilitating data communication with each of data storage devices 416, 420, and 424, using networks 418, 422, and 426 respectively.

By configuring each of PIOAs 410, 412, and 414 to access as many data storage devices and networks as possible in a given data processing environment, each PIOA becomes a functional equivalent of the other PIOA of the same type. Thus, in accordance with the illustrative embodiment, an application or a data processing system component using a particular PIOA can utilize any of the other functionally equivalent PIOAs to perform the same task, such as communicating with a particular data storage device or network.

Figure 5:
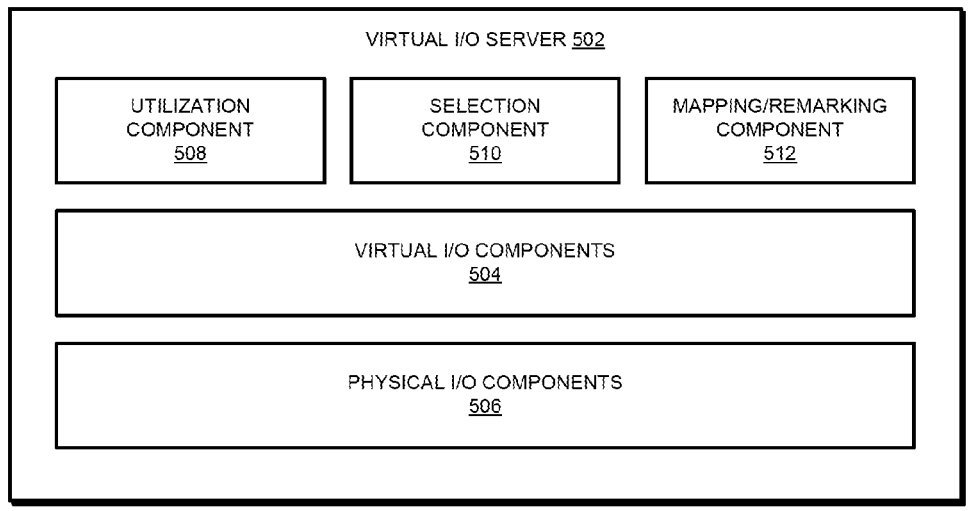
FIG. 5 depicts a block diagram of some example components of a virtual I/O server in accordance with an illustrative embodiment.

With reference to FIG. 5, this figure depicts a block diagram of some example components of a virtual I/O server in accordance with an illustrative embodiment. virtual I/O server 502 may be implemented using virtual I/O server 404 in FIG. 4 and may be modified according to the illustrative embodiment.

Virtual I/O adapter 502 manages virtual I/O components 504. Virtual I/O components 504 include VIOAs that correspond to PIOAs included in physical I/O components 506.

Virtual I/O adapter further includes utilization component 508, selection component 510, and mapping and remapping component 512. Each of utilization component 508, selection component 510, and mapping and remapping component 512 according to the illustrative embodiment may be implemented as hardware, software, or a combination thereof.

Utilization component 508 allows virtual I/O server to compute the utilization of PIOAs. Utilization of a PIOA is the fraction of available capacity of the PIOA that is used over a period. The period over which the utilization is measured is called a utilization interval.

The invention allows a virtual I/O server to adjust the number of powered on PIOAs by powering up or powering down PIOAs based on their utilization. For example, in one embodiment, the virtual I/O server may determine that two functionally equivalent PIOAs are being utilized less than fifty percent each. According to an illustrative embodiment, the virtual I/O server may select one of the two functionally equivalent PIOAs to power down and transfer the workload from the powered down PIOA to the other PIOA.

Selection component 510 allows virtual I/O server 502 to make the selection of the PIOA to shut down from among the several PIOAs that may be operational at any given time. Selection component 510 also allows virtual I/O server 502 to make the selection of the PIOA to power up from among the several PIOAs that may not be operational at any given time. Selection component 510 may employ any known algorithm for making the selection. For example, in one embodiment, selection component 510 may select the least utilized PIOA from among all the operating PIOAs to shut down.

In another embodiment, selection component 510 may select for shut down a PIOA that may be in an I/O drawer that has all the other PIOAs shut down. In this manner, selection component 510 can further select the I/O drawer for shut down as well as compared to shutting down a PIOA in an I/O drawer that has to remain operational because other PIOAs in that I/O drawer have to remain operational. Conversely, selection component 510 may select for powering up such a PIOA that exists in an I/O drawer that already has several PIOAs powered up. In this manner, virtual I/O server 502 can avoid having to power up a shut down I/O drawer and conserve the energy that the I/O drawer itself consumes for operating.

Mapping and remapping component 512 allows virtual I/O server 502 to map VIOAs to PIOAs that remain after some PIOAs are powered down, or after new PIOAs are powered up. Mapping a VIOA to a PIOA is the process of associating the VIOA to the PIOA such that any communication using the VIOA occurs using the associated PIOA. Remapping a VIOA is the process of disassociating the VIOA from the existing PIOA that may be selected for shut down, and mapping the VIOA to another functionally equivalent PIOA for continuing the communication through the other PIOA. Remapping a VIOA also includes the process of disassociating a VIOA from the other functionally equivalent PIOA and reassociating the VIOA with the original PIOA than may have been previously shut down when the original PIOA is powered up again.

Once selection component 510 has selected one or more PIOAs to shut down, mapping and remapping component 512 maps the VIOAs in use to the remaining PIOAs that may be operational within the control of virtual I/O server 502. Similarly, once selection component 510 has selected one or more PIOAs to power up, such as to meet an increased data traffic, mapping and remapping component 512 maps the VIOAs in use to the set of operational PIOAs that includes the newly powered up PIOA.

Figure 6:
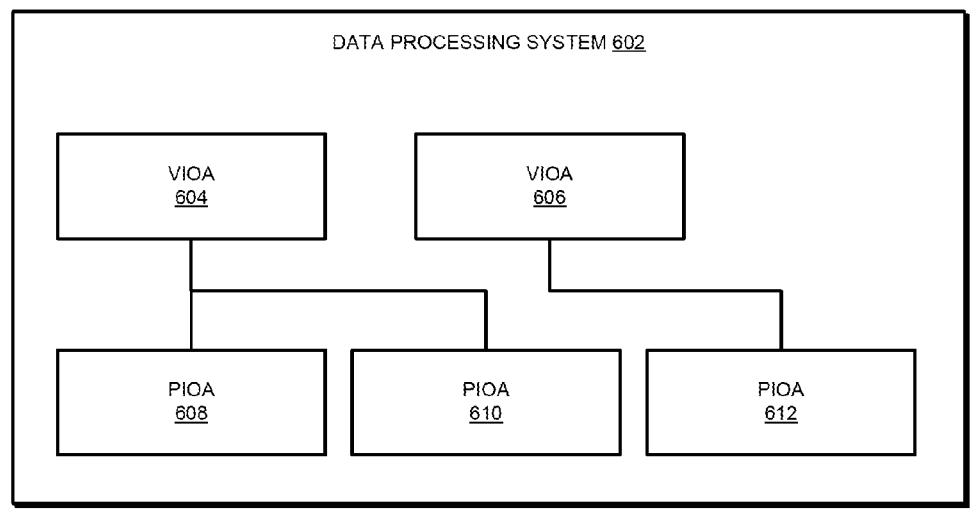
FIG. 6 depicts a block diagram of an example mapping of VIOAs to PIOAs in accordance with an illustrative embodiment.

With reference to FIG. 6, this figure depicts a block diagram of an example mapping of VIOAs to PIOAs in accordance with an illustrative embodiment. Data processing system 602 may be analogous to data processing system 402 in FIG. 4.

VIOAs 604 and 606 may be example VIOAs that may be some of virtual I/O components 504 in FIG. 5. Accordingly, VIOAs 604 and 606 may be operating under and managed by a virtual I/O server, such as virtual I/O server 502 in FIG. 5.

PIOAs 608, 610, and 612 may be some of physical I/O components 506 in FIG. 5. As an example, PIOA 608 and PIOA 610 may be of different types in that they each facilitate communication with different types of networks. For example, PIOA 608 may be a WAN network adapter and PIOA 610 may be a LAN network adapter. Furthermore, as an example, PIOAs 610 and 612 may be functional equivalents of each other.

As an example, VIOA 604 may be mapped to PIOAs 608 and 610. Thus VIOA 604 may provide an application or a component access to either a WAN via PIOA 608 or a LAN via PIOA 610 without the application or the component knowing the existence of PIOAs 608 and 610. Similarly, VIOA 606 may be mapped to PIOA 612. Thus VIOA 606 may provide an application or a component access to a LAN via PIOA 612 without the application or the component knowing the existence of PIOA 612.

Figure 7:
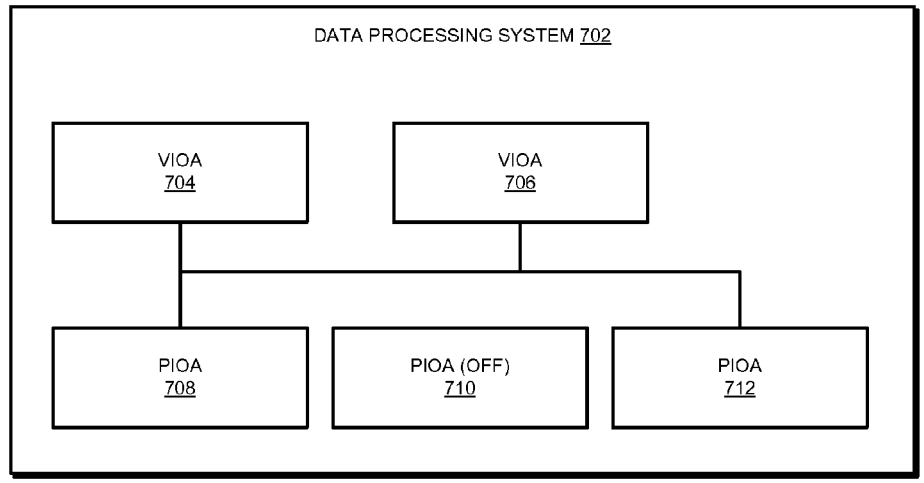
FIG. 7 depicts a block diagram of an example remapping of VIOAs to PIOAs in accordance with an illustrative embodiment.

With reference to FIG. 7, this figure depicts a block diagram of an example remapping of VIOAs to PIOAs in accordance with an illustrative embodiment. Data processing system 702 may be the same as data processing system 602 in FIG. 6.

VIOAs 704 and 706 may be identical to VIOAs 604 and 606 in FIG. 6, and may be mapped as shown in FIG. 6 prior to being configured as shown in FIG. 7. PIOAs 708, 710, and 712 may be identical to PIOAs 608, 610, and 612 in FIG. 6. PIOAs 708, 710, and 712 may be mapped to VIOAs 704 and 706 in the manner of FIG. 6 prior to being mapped as shown in FIG. 7.

The utilization component, such as utilization component 508 in FIG. 5, of the virtual I/O server that manages VIOAs 704 and 706 may compute utilization of PIOAs 708, 710, and 712. Based on the utilization of PIOAs 708, 710, and 712, the selection component, such as selection component 510 in FIG. 5, of the virtual I/O server may determine that PIOA 710 can be powered off. Accordingly, the virtual I/O server may shut down PIOA 710.

The mapping and remapping component, such as mapping and remapping component 512 in FIG. 5, of the virtual I/O server may remap VIOA 704 to remaining operational PIOAs. The mapping and remapping component may use the information about the functional equivalency of the various operational PIOAs to perform the remapping. In the example depicted in this figure, the mapping and remapping component may recognize that shut down PIOA 710 and operating PIOA 712 are functionally equivalent.

Further, from the utilization component's computations, the mapping and remapping component may also recognize that the utilization of PIOA 712 can be increased without exceeding PIOA 712's threshold utilization, by adding the workload from shut down PIOA 710 to PIOA 712.

Accordingly, the mapping and remapping component may remap VIOA 704 to PIOAs 708 and 712. According to the remapping, applications or components that were directing LAN traffic to VIOA 704 continue to be serviced by VIOA 704. However, VIOA 704 now accesses the LAN via PIOA 712 instead of PIOA 710.

By this utilization computation, selection for shut down, and remapping the VIOAs and PIOAs, the illustrative embodiment increases utilization of PIOA 712 and reduces energy consumption by using fewer PIOAs. Additionally, the illustrative embodiment accomplish these and other advantages while keeping the actual status of the physical I/O components transparent to the applications or components that may be using the physical I/O components in a virtualized manner.

Conversely, when the data traffic increases such that the utilization of PIOA 712 approaches or exceeds the threshold utilization set for PIOA 712, PIOA 710 may be powered up again. The utilization component may recompute the utilization of PIOA 712. The selection component may select PIOA 710 for powering up. The mapping and remapping component may remap VIOA 704 to PIOAs 708 and 710.

Figure 8:
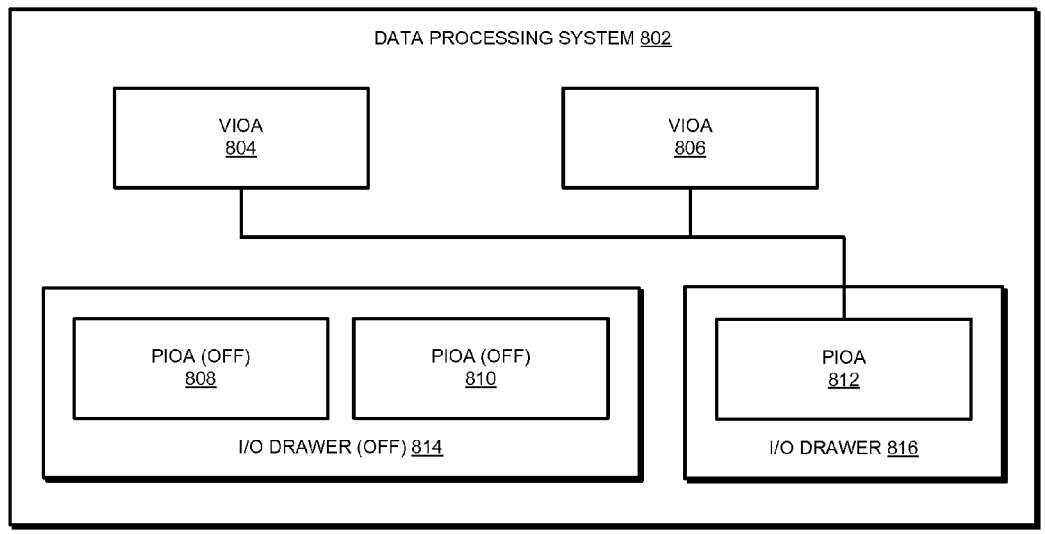
FIG. 8 depicts a block diagram of another example remapping of VIOAs to PIOAs in accordance with an illustrative embodiment.

With reference to FIG. 8, this figure depicts a block diagram of another example remapping of VIOAs to PIOAs in accordance with an illustrative embodiment. Data processing system 802 may be the same as data processing system 702 in FIG. 7.

VIOAs 804 and 806 may be identical to VIOAs 704 and 706 in FIG. 7, and may be mapped as shown in FIG. 7 prior to being configured as shown in FIG. 8. PIOAs 808, 810, and 812 may be identical to PIOAs 708, 710, and 712 in FIG. 7. PIOAs 808, 810, and 812 may be mapped to VIOAs 804 and 806 in the manner of FIG. 7 prior to being mapped as shown in FIG. 8. Furthermore, PIOAs 808 and 810 may belong to I/O drawer 814, and PIOA 812 may belong to I/O drawer 816 in this example configuration.

For one version of this example, assume that PIOA 808, which facilitates WAN communication through VIOA 804 reduces in utilization to zero. In other words, no application or component using VIOA 804 is directing any data communication to the WAN.

The utilization component of the virtual I/O server detects the zero utilization of PIOA 808. The selection component of the virtual I/O server selects PIOA 808 for powering down and shuts down PIOA 808. Mapping and remapping component of the virtual I/O server remaps VIOA 804 to only use PIOA 812.

As described in the earlier stage of this example as depicted in FIG. 7, PIOA 810 was already shut down in as PIOA 710 in FIG. 7. The selection component of the virtual I/O server determines that all PIOAs in I/O drawer 814 are now powered off. Even when all the PIOAs therein have been shut down, I/O drawer 814 itself consumes some energy to remain available.

According to one embodiment of the invention, the virtual I/O server power down I/O drawer 814 as well. Thus, the embodiment results in additional reduction in energy consumption over the energy reduction achieved by powering down PIOAs 808 and 810.

For another version of this example (not shown), assume that PIOA 808, which facilitates WAN communication through VIOA 804 reduces in utilization to a non-zero value. The utilization component of the virtual I/O server detects the non-zero utilization of PIOA 808. The mapping component identifies another functionally equivalent PIOA whose utilization will not exceed a threshold utilization by transferring the load from PIOA 808 to that PIOA. The selection component of the virtual I/O server selects PIOA 808 for powering down and shuts down PIOA 808. Mapping and remapping component of the virtual I/O server remaps VIOA 804 to use PIOA 812 and the other PIOA that is functionally equivalent to PIOA 808, managed by the virtual I/O server, and whose utilization will not exceed by the remapping.

When the data traffic increases such that the VIOA 804 needs PIOA 808, PIOA 808 may be powered up again along with I/O drawer 814. The mapping and remapping component may remap VIOA 804 to PIOAs 808 and 812.

The specific configurations of FIGS. 6, 7, and 8 are depicted as described only as examples for the clarity of the operation of the illustrative embodiments. These configurations are not intended be limiting on the invention. Many other configurations and manipulation of those configurations will be apparent from this disclosure and the same are contemplated within the scope of the invention.

Additionally, the order or placement of the operations described with respect to FIGS. 6, 7, and 8 are only examples and not intended to be limiting on the invention. For example, an operation, such as identification of functionally equivalent PIOAs, may be performed in any of the components shown in FIG. 5, or any other component of a data processing system as may be suitable for a given configuration. Other operations described with respect to FIGS. 6, 7, and 8 may be similarly located to any suitable component within the scope of the illustrative embodiments.

Furthermore, these operations may be performed in any manner and order suitable for a given configuration within the scope of the illustrative embodiments. For example, the remapping may occur simultaneously with, before, or after a PIOA is powered down or powered up. Other operations may be similarly re-ordered within the scope of the illustrative embodiments.

Figure 9:
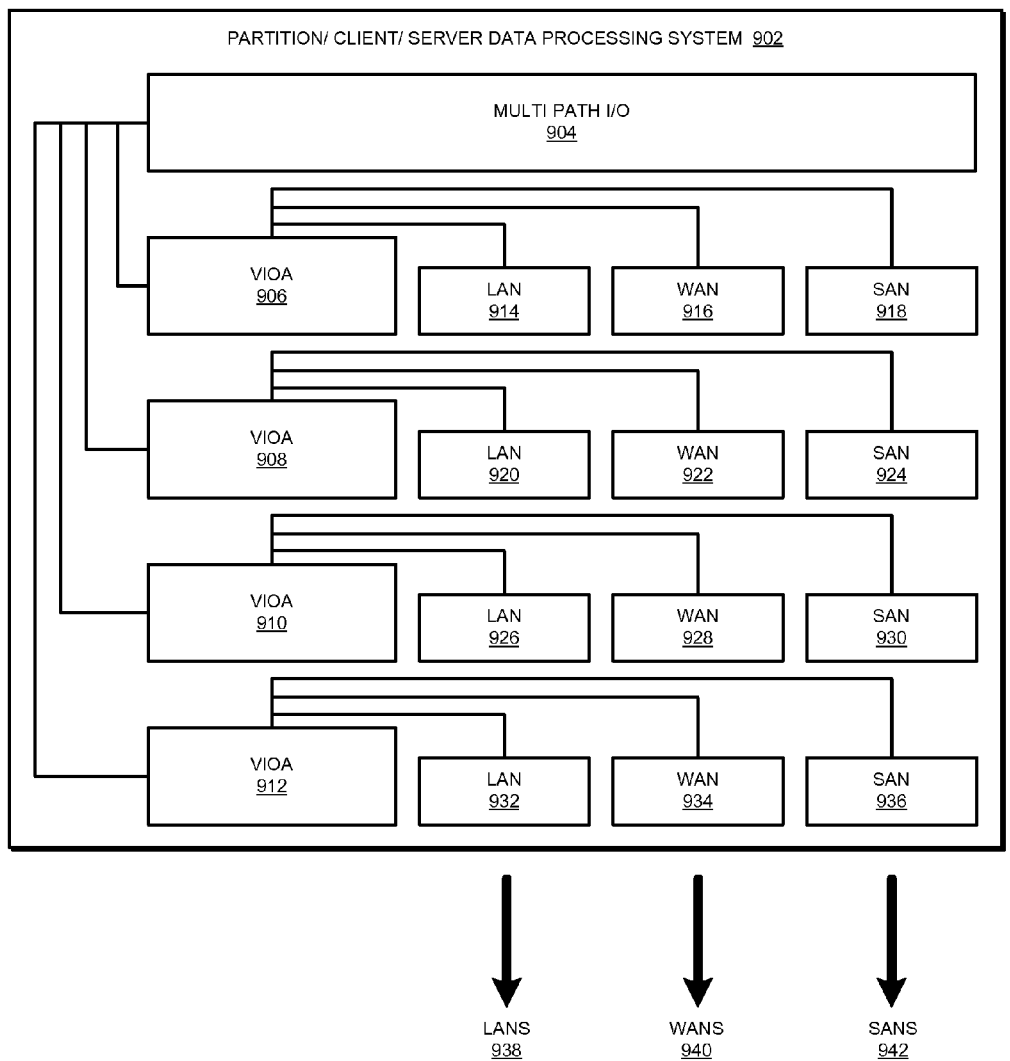
FIG. 9 depicts a block diagram of a multipath I/O configuration in a client or server data processing system or a partition in accordance with an illustrative embodiment.

With reference to FIG. 9, this figure depicts a block diagram of a multipath I/O configuration in a client or server data processing system or a partition in accordance with an illustrative embodiment. Data processing system 902 may be implemented using data processing system 100 in FIG. 1, 802 in FIG. 8, or any other general purpose computer in a client or server configuration.

Multipath I/O component 904 may be a component in data processing system 902 that facilitates multipath I/O with a set of data storage devices and a set of networks. A set of data storage devices is one or more data storage device of same or different types. A set of networks is one or more network of same or different types.

Multipath I/O component 904 may utilize a set of VIOAs for performing the multipath I/O function. A set of VIOAs is one or more VIOA. For example multipath I/O component 904 may use VIOAs 906, 908, 910, and 912 for this purpose.

Each of VIOAs 906, 908, 910, and 912 may correspond to a set of PIOAs. For example, and for the clarity of the description, this figure depicts each of VIOAs 906-912 to be mapped to one LAN PIOA, one WAN PIOA and one SAN PIOA. Any number of any types of PIOA can be similarly mapped to a VIOA without posing any limitations on the invention.

VIOA 906 maps as an example, to LAN PIOA 914, WAN PIOA 916, and SAN PIOA 918. VIOA 908 maps as an example, to LAN PIOA 920, WAN PIOA 922, and SAN PIOA 924. VIOA 910 maps as an example, to LAN PIOA 926, WAN PIOA 928, and SAN PIOA 930. VIOA 912 maps as an example, to LAN PIOA 932, WAN PIOA 934, and SAN PIOA 936.

LAN PIOAs 914, 920, 926, and 932 may communicate with LANs 938. WAN PIOAs 916, 922, 928, and 934 may communicate with WANs 940. SAN PIOAs 918, 924, 930, and 936 may communicate with SANs 942.

Figure 10:
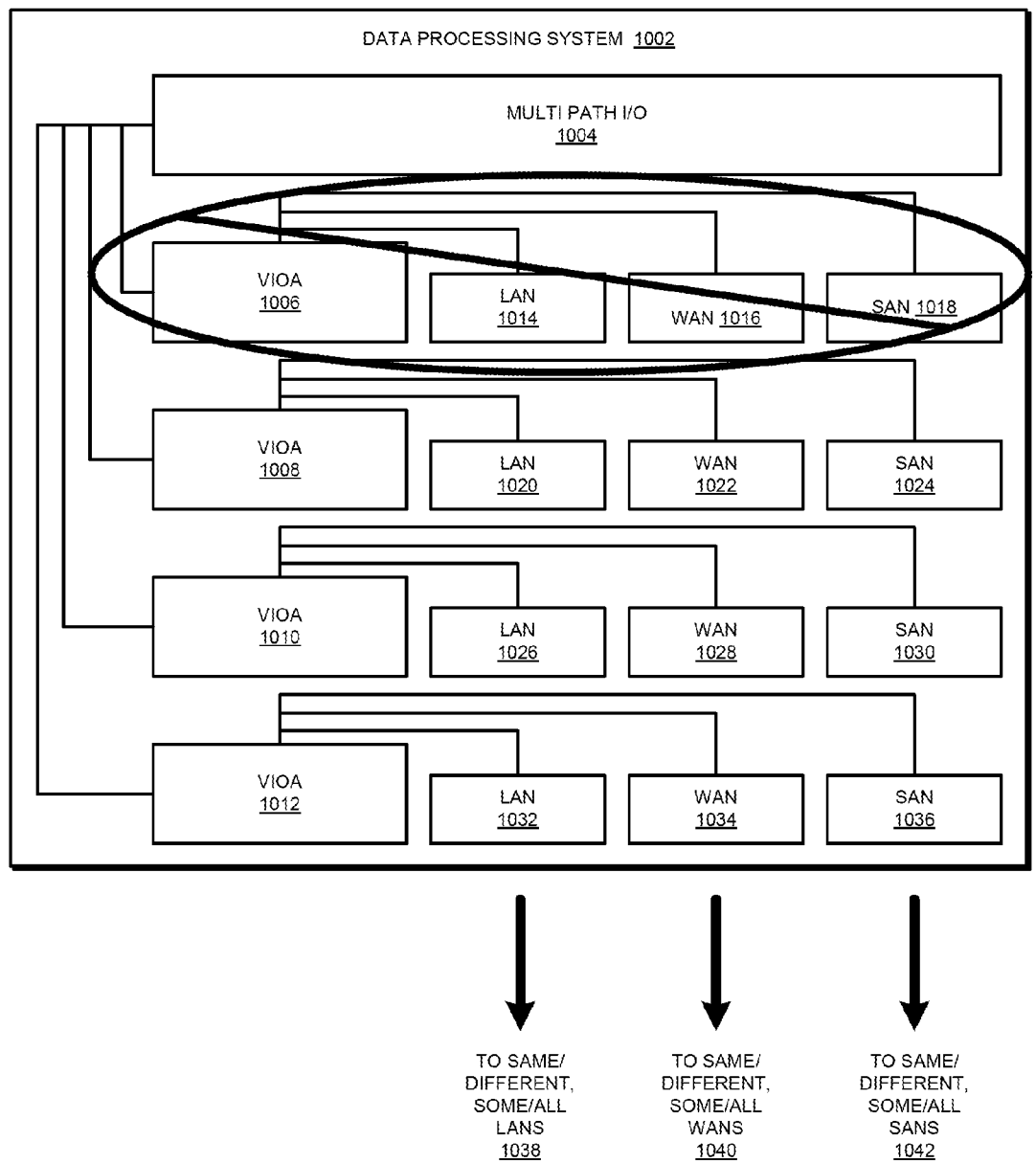
FIG. 10 depicts a block diagram of a reconfigured multipath I/O configuration in a client or server data processing system or a partition in accordance with an illustrative embodiment.

With reference to FIG. 10, this figure depicts a block diagram of a reconfigured multipath I/O configuration in a client or server data processing system or a partition in accordance with an illustrative embodiment. Data processing system 1002 may be implemented using data processing system 902 in FIG. 9. Blocks, components, and labels using reference numerals 1002-1042 are analogous to corresponding blocks, components, and labels using reference numerals 902-942 in FIG. 9.

In addition, the PIOAs in this configuration of data processing system 1002 are configured to communicate with all possible data storage devices or networks such that PIOAs of a type are functionally equivalent to each other. For example, LAN PIOAs 1014, 1020, 1026, and 1032 may communicate with some or all of same or different LANs 1038. WAN PIOAs 1016, 1022, 1028, and 1034 may communicate with some or all of same or different WANs 1040. SAN PIOAs 1018, 1024, 1030, and 1036 may communicate with some or all of same or different SANs 1042.

Configured in this manner according to the illustrative embodiment, VIOAs 1006, 1008, 1010, and 1012 are also functional equivalents of each other. In other words, an application or a component using VIOA 1006 for data communication, for example, can just as well use VIOA 1008 for a similar purpose.

In a multipath environment, such as when using multipath I/O component 1004, applications and components direct their communication requests to multipath I/O component 1004 instead of specific VIOAs. Multipath I/O component 1004 in turn selects one or more VIOA to use for processing the communication requests.

A utilization component of a virtual I/O server that manages VIOAs 1006-1012 may determine utilization of PIOAs 1014-1036. Depending on the utilization of the various PIOAs, a selection component may select one or more PIOAs of various types for shutting down in circumstances when the communication load can be executed using fewer PIOAs.

In certain circumstances, all PIOAs associated with a VIOA may be powered off. In this illustrative embodiment, instead of remapping the VIOA whose all PIOAs have been powered off, the illustrative embodiment deactivates that VIOA as well. Deactivating a VIOA is making the VIOA unavailable by deleting, reconfiguring, or setting or resetting data associated with the VIOA.

For example, assume that LAN PIOA 1014, WAN PIOA 1016, and SAN PIOA 1018 are selected by the selection component for powering off, and are shut down. According to the illustrative embodiment, the virtual I/O server deactivates VIOA 1006, which was mapped to PIOAs 1014-1018.

Multipath I/O component 1004 detects that a VIOA, such as VIOA 1006, that was previously active has been deactivated. Upon such detection, multipath I/O component 1004 rebalances the distribution of multipath I/O component 1004's communication workload to the remaining operational VIOAs. In the depicted example, multipath I/O component 1004 redistributes the workload to VIOAs 1008, 1010, and 1012.

When communication workload increases beyond a threshold, virtual I/O server may decide to power on a powered off PIOA. The virtual I/O server may also reactivate a VIOA and map the reactivated VIOA to the newly powered on PIOA. Multipath I/O component 1004 may detect that a new VIOA with certain types of communication capabilities is active. Multipath I/O component 1004 may rebalance the communication workload using the new newly activated VIOA and other operational VIOAs.

Figure 11:
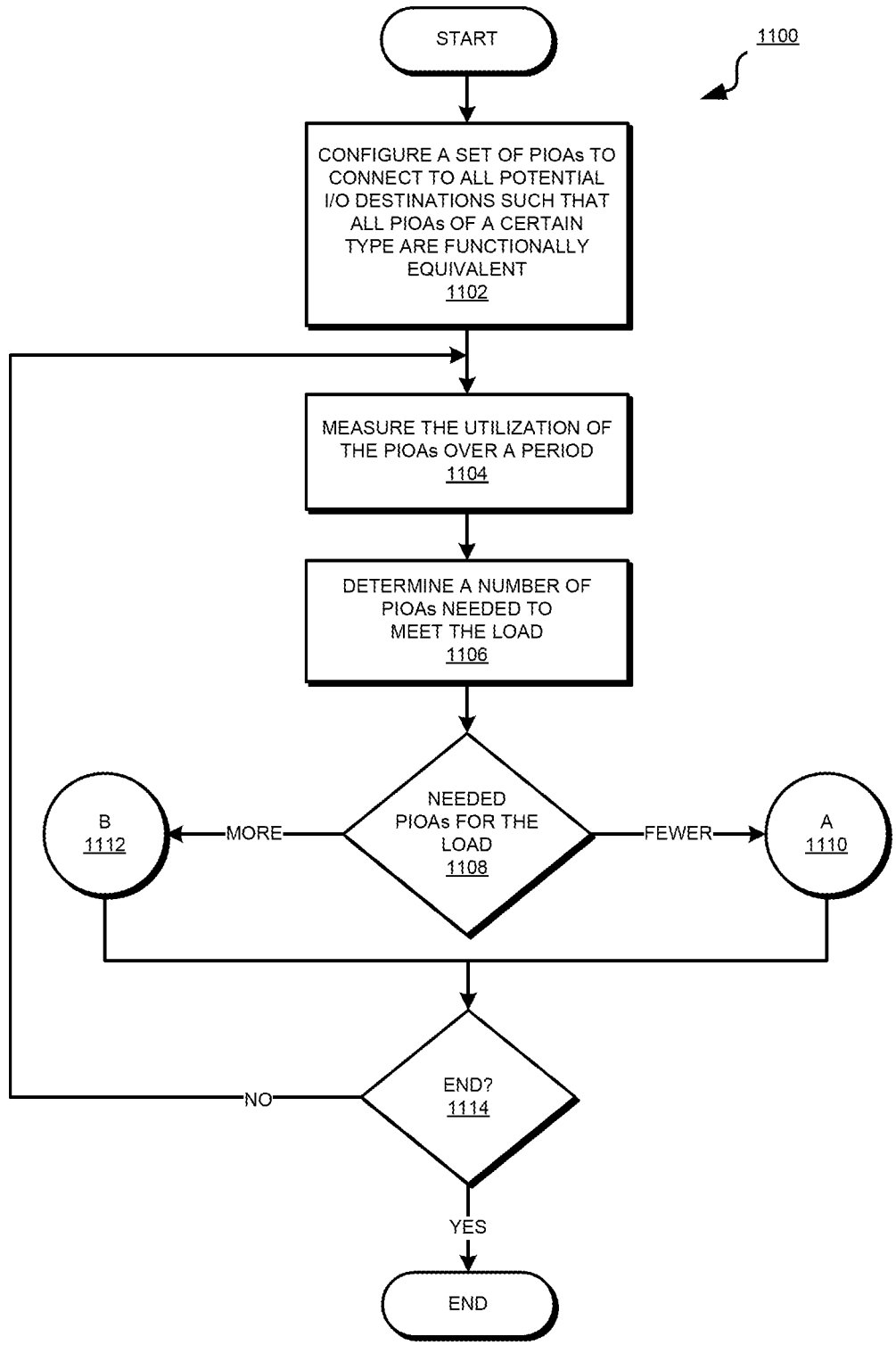
FIG. 11 depicts a flowchart of a process of managing a computing resource in accordance with an illustrative embodiment.

With reference to FIG. 11, this figure depicts a flowchart of a process of managing a computing resource in accordance with an illustrative embodiment. process 1100 can be implemented in a virtual I/O server, such as virtual I/O server 502 in FIG. 5.

Process 1100 begins by configuring a set of PIOAs to connect to all potential I/O destinations, such as data storage devices or networks, in a set of I/O destinations (step 1102). The configuration of step 1102 configures the PIOAs in the set of PIOAs to be functional equivalents of one another.

Process 1100 measures the utilization of the configured PIOAs over a period (step 1104). Process 1100 determines a number of PIOAs needed to meet, service, or otherwise handle a workload (step 1106). Process 1100 determines a number of PIOAs that can manage the workload (step 1108).

If the number of PIOAs that can manage the workload is smaller than the number of operational PIOAs ("Fewer" path of step 1108), process 1100 proceeds to process labeled "A" in this disclosure (step 1110). Process A is described with respect to FIGS. 12 and 13.

If the number of PIOAs that can manage the workload is larger than the number of operational PIOAs ("More" path of step 1108), process 1100 proceeds to process labeled "B" in this disclosure (step 1112). Process B is described with respect to FIGS. 14 and 15.

Upon return from process A or B, process 1100 determines whether process 1100 should terminate (step 1114). If process 1100 determines that process 1100 should not terminate ("No" path of step 1114), process 1100 returns to step 1104. If process 1100 determines that process 1100 should terminate ("Yes" path of step 1114), process 1100 ends thereafter.

Figure 12:
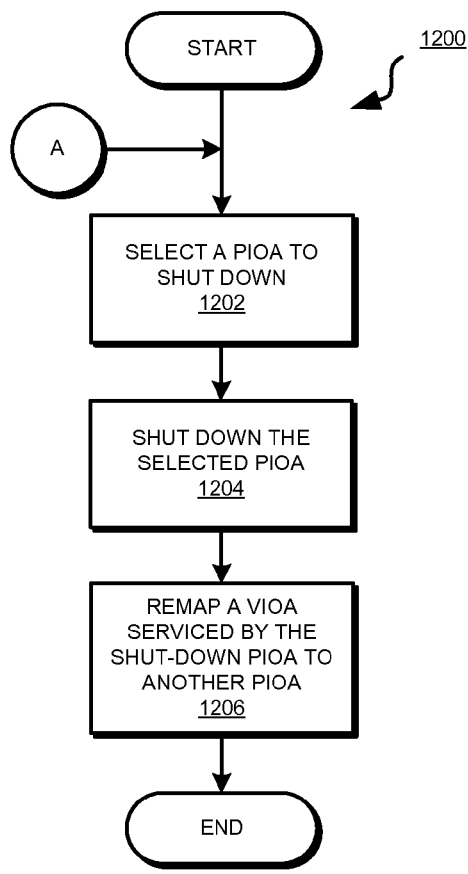
FIG. 12 depicts a process of reducing the number of operating PIOAs in accordance with an illustrative embodiment.

With reference to FIG. 12, this figure depicts a process of reducing the number of operating PIOAs in accordance with an illustrative embodiment. Process 1200 can be implemented in a virtual I/O server, such as virtual I/O server 502 in FIG. 5. Furthermore, process 1200 can be called from process 1100 as process A.

Process 1200 begins by selecting a PIOA to shut down (step 1202). Process 1200 shuts down the selected PIOA (step 1204). Process 1200 remaps a VIOA serviced by the shut down PIOA to another operational functionally equivalent PIOA (step 1206). Process 1200 ends thereafter.

Figure 13:
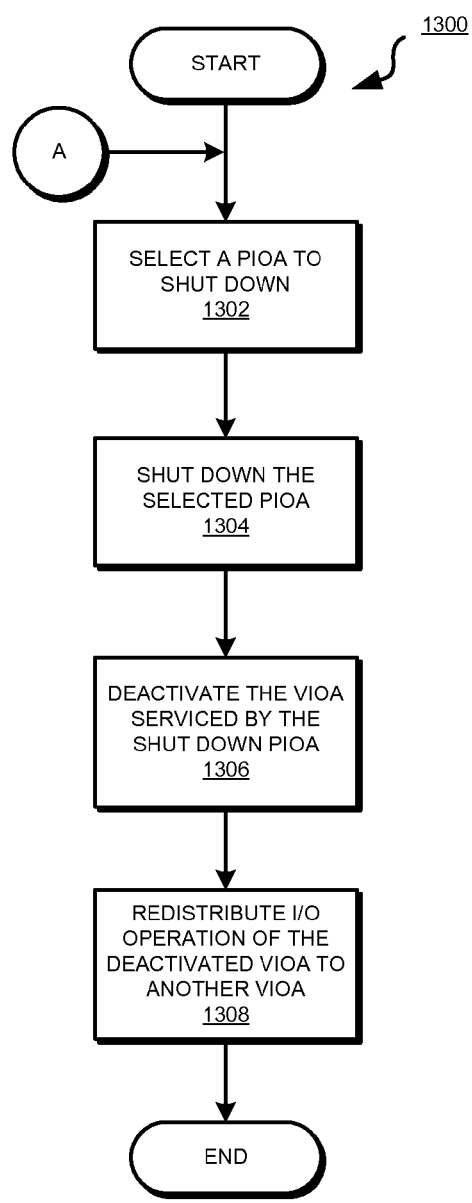
FIG. 13 depicts another process of reducing the number of operating PIOAs in accordance with an illustrative embodiment.

With reference to FIG. 13, this figure depicts another process of reducing the number of operating PIOAs in accordance with an illustrative embodiment. Process 1300 can be implemented in a virtual I/O server, such as virtual I/O server 502 in FIG. 5. Furthermore, process 1300 can be called from process 1100 as process A.

Process 1300 begins by selecting a PIOA to shut down (step 1302). Process 1300 shuts down the selected PIOA (step 1304). Process 1300 deactivates the VIOA serviced by the shut down PIOA (step 1306). Process 1300 redistributes I/O operations of the deactivated VIOA to another active functionally equivalent VIOA (step 1308). Process 1300 ends thereafter.

Figure 14:
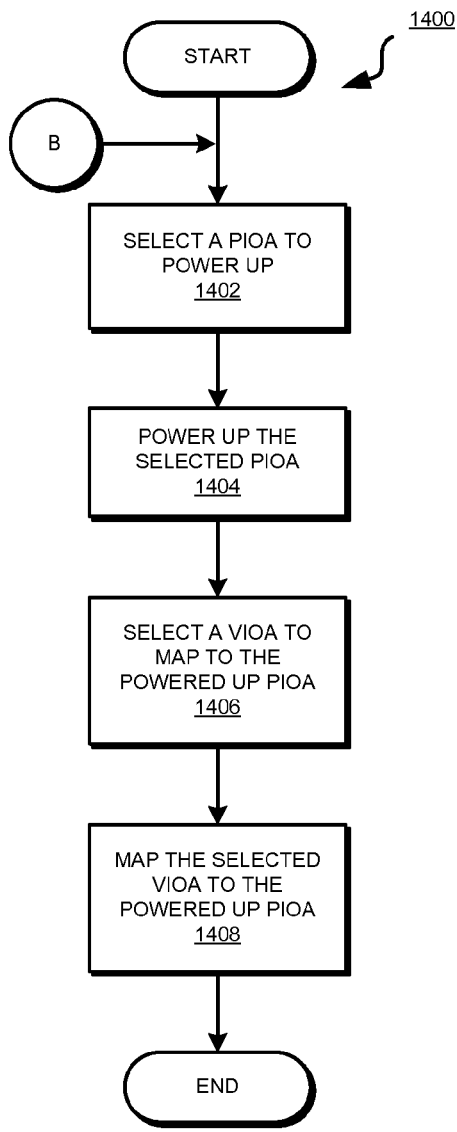
FIG. 14 depicts a process of increasing the number of operating PIOAs in accordance with an illustrative embodiment.

With reference to FIG. 14, this figure depicts a process of increasing the number of operating PIOAs in accordance with an illustrative embodiment. Process 1400 can be implemented in a virtual I/O server, such as virtual I/O server 502 in FIG. 5. Furthermore, process 1400 can be called from process 1100 as process B.

Process 1400 begins by selecting a PIOA to power up (step 1402). Process 1400 powers up the selected PIOA (step 1404). Process 1400 selects a VIOA to map to the powered up PIOA (step 1406). Process 1400 maps the selected VIOA to the powered up PIOA (step 1408). Process 1400 ends thereafter.

Figure 15:
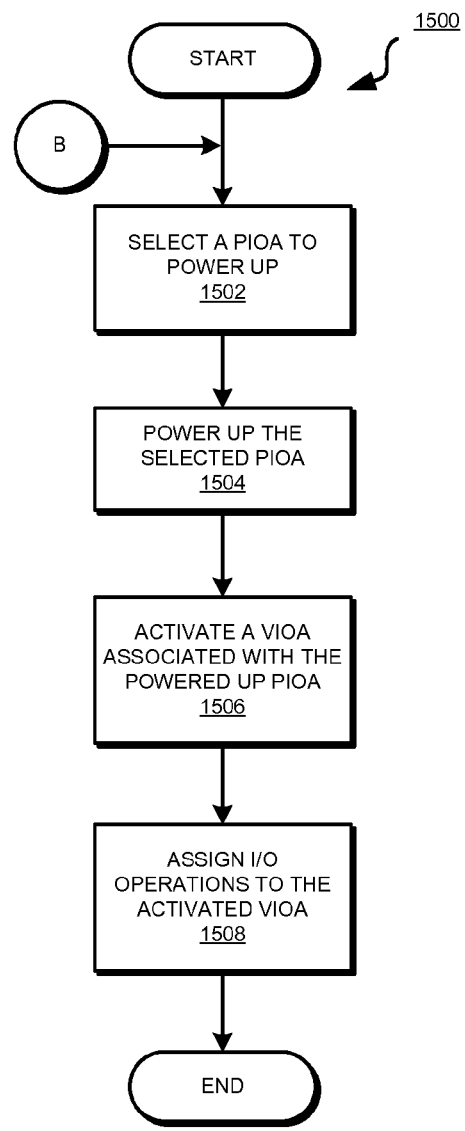
FIG. 15 depicts another process of increasing the number of operating PIOAs in accordance with an illustrative embodiment.

With reference to FIG. 15, this figure depicts another process of increasing the number of operating PIOAs in accordance with an illustrative embodiment. Process 1500 can be implemented in a virtual I/O server, such as virtual I/O server 502 in FIG. 5. Furthermore, process 1500 can be called from process 1100 as process B.

Process 1500 begins by selecting a PIOA to power up (step 1502). Process 1500 powers up the selected PIOA (step 1504). Process 1500 activates a VIOA associated with the powered up PIOA (step 1506). Process 1500 assigns I/O operations to the activated VIOA (step 1508). Process 1500 ends thereafter.

Figure 16:
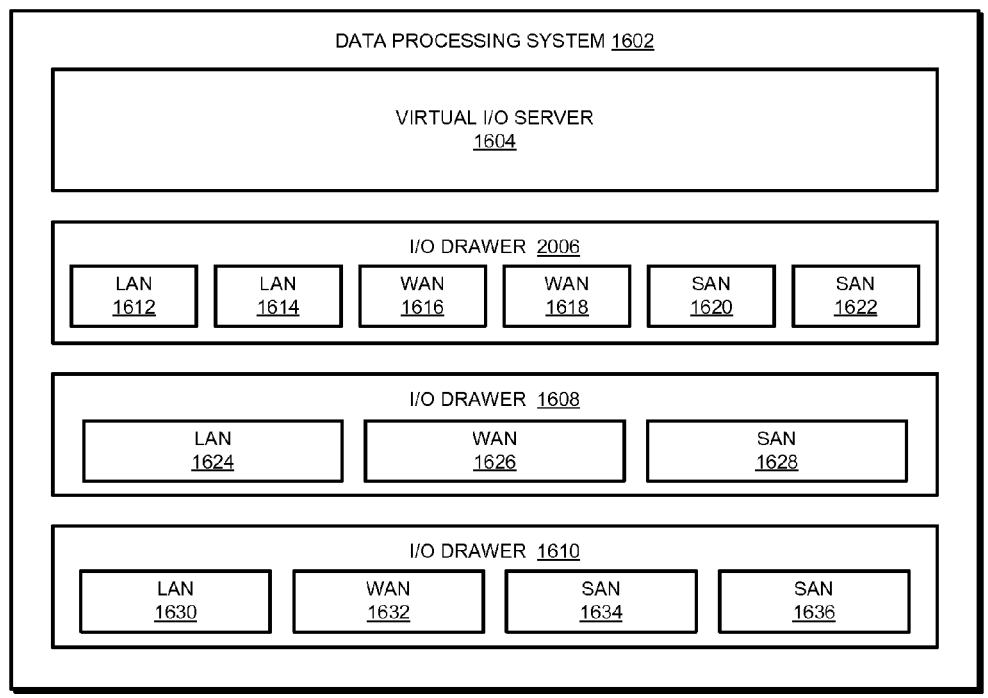
FIG. 16 depicts a block diagram of an I/O drawer configuration of a data processing system in accordance with an illustrative embodiment.

With reference to FIG. 16, this figure depicts a block diagram of an I/O drawer configuration of a data processing system in accordance with an illustrative embodiment. Data processing system 1602 may be analogous to data processing system 402 in FIG. 4. Virtual I/O server 1604 may be analogous to virtual I/O server 404 in FIG. 4.

Data processing system 1602 may include a set of I/O drawers, such as I/O drawers 1606, 1608, and 1610. A set of I/O drawers is one or more I/O drawer.

Each I/O drawer may include a set of PIOAs. As an example, I/O drawer 1606 is depicted as including PIOAs 1612 and 1614 that facilitate connectivity with same or different LANs. I/O drawer 1606 is also depicted to include PIOAs 1616 and 1618 that facilitate connectivity with same or different WANs. I/O drawer 1606 is also depicted to include PIOAs 1620 and 1622 that facilitate connectivity with same or different SANs.

Similarly, as an example, I/O drawer 1608 is depicted as including PIOAs 1624, 1626, and 1628 that facilitate connectivity with a LAN, a WAN, and a SAN respectively. I/O drawer 1610 is depicted as including PIOAs 1620 and 1631 that facilitate connectivity with a LAN and a WAN respectively. I/O drawer 1610 also includes PIOAs 1634 and 1636 that facilitate connectivity to same or different SANs.

Figure 17:
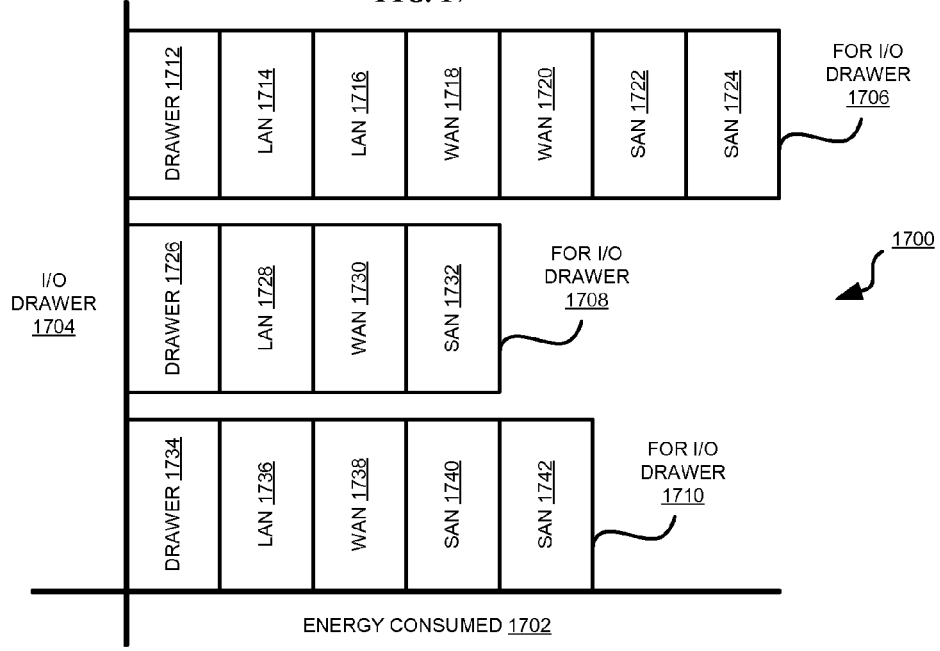
FIG. 17 depicts a graph of energy consumption in I/O drawers in accordance with an illustrative embodiment.

With reference to FIG. 17, this figure depicts a graph of energy consumption in I/O drawers in accordance with an illustrative embodiment. Graph 1700 depicts example energy consumption of I/O drawers 1606, 1608, and 1610 and their respective physical I/O components in FIG. 16.

Graph 1700 depicts energy consumption 1702 along X-axis and I/O drawer 1704 along Y-axis. I/O drawers 1706, 1708, and 1710 and their respective physical I/O components correspond to I/O drawers 1606, 1608, and 1610 and their respective physical I/O components respectively in FIG. 16.

Graph 1700 depicts example energy consumption of I/O drawers 1706, 1708, and 1710 and their respective physical I/O components. The block for I/O drawer 1706 in graph 1700 shows block 1712 that represents energy consumption of I/O drawer 1706, without any PIOAs operating therein. Blocks 1714 and 1716 represent energy consumption of the two LAN PIOAs in I/O drawer 1706. Blocks 1718 and 1720 represent energy consumption of the two WAN PIOAs in I/O drawer 1706. Blocks 1722 and 1724 represent energy consumption of the two SAN PIOAs in I/O drawer 1706.

Similarly, the block for I/O drawer 1708 in graph 1700 shows block 1726 that represents energy consumption of I/O drawer 1708, without any PIOAs operating therein. Blocks 1728, 1730, and 1732 represent energy consumption of the LAN, WAN and SAN PIOAs respectively in I/O drawer 1708.

Similarly, the block for I/O drawer 1710 in graph 1700 shows block 1734 that represents energy consumption of I/O drawer 1710, without any PIOAs operating therein. Blocks 1736 and 1738 represent energy consumption of the LAN and WAN PIOAs respectively in I/O drawer 1710. Blocks 1740 and 1742 represent energy consumption of the two SAN PIOAs in I/O drawer 1710.

Figure 18:
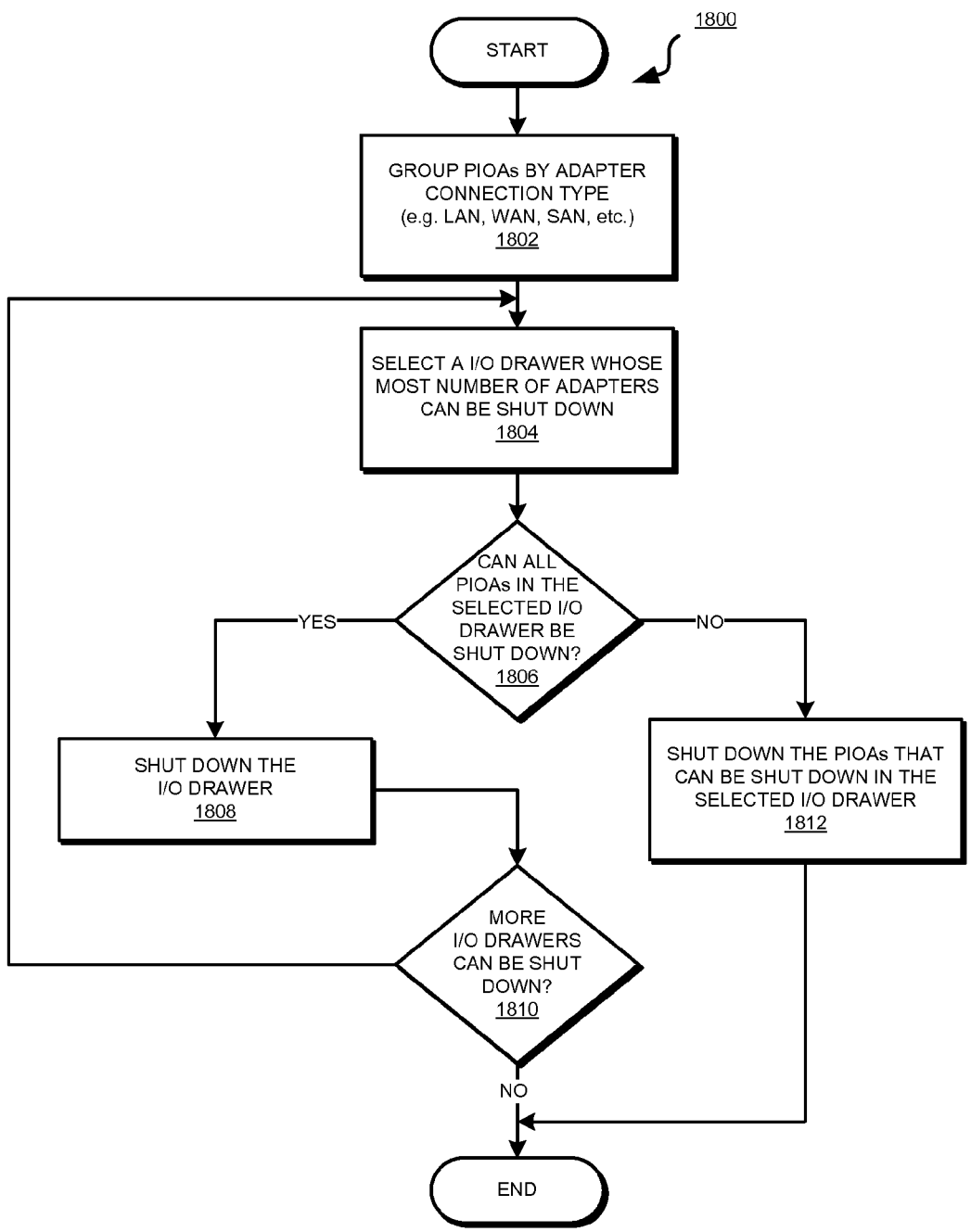
FIG. 18 depicts a flowchart of a process of scaling down energy consumption by powering down I/O drawers in accordance with an illustrative embodiment.

With reference to FIG. 18, this figure depicts a flowchart of a process of scaling down energy consumption by powering down I/O drawers in accordance with an illustrative embodiment. Process 1800 can be implemented in a virtual I/O server, such as virtual I/O server 502 in FIG. 5.

Process 1800 begins by grouping PIOAs by adapter connection type, for example, by forming groups of LAN adapters, WAN adapters, and SAN adapters (step 1802). Process 1800 selects a drawer whose most number of PIOAs can be shut down and their I/O operations transferred to other operating PIOAs in other I/O drawers without adversely affecting performance (step 1804).

Process 1800 determines whether all PIOAs in the selected drawer can be shut down (step 1806). If all PIOAs in the selected drawers can be shut down ("Yes" path of step 1806), process 1800 shuts down the I/O drawer (step 1808).

Process 1800 then determines whether more I/O drawers can be shut down (step 1810). If more I/O drawers can be shut down ("Yes" path of step 1810), process 1800 returns to step 1804. If no more I/O drawers can be shut down ("No" path of step 1810), process 1800 ends thereafter.

Returning to step 1806, if process 1800 determines that all PIOAs in the selected drawer cannot be shut down ("No" path of step 1806), process 1800 shuts down the PIOAs that can be shut down in the selected I/O drawer (step 1812). Process 1800 then proceeds to step 1810 and either returns to step 1804 or ends thereafter based on the determination of step 1810.

Selecting an I/O drawer in step 1804 can employ any algorithm for selection within the scope of the invention. For example, one selection algorithm can exclude an I/O drawer from shut down consideration that does not have redundant PIOAs of a certain type, as that I/O drawer is likely to be required for maintaining connectivity to a certain type of network. Many other considerations and algorithms can be used in making the selection of I/O drawers to shut down in process 1800.

Shutting down an I/O drawer according to the illustrative embodiments causes additional conservation of energy. For example, consider the block depicting energy consumption of I/O drawer 1706 as depicted in graph 1700 in FIG. 17. By shutting down a LAN PIOA in I/O drawer 1706 in FIG. 17, only the energy represented by block 1714 in FIG. 17 may be conserved. Shutting down all PIOAs in drawer 1706 in FIG. 17 still leaves that I/O drawer consuming energy represented by block 1712 in FIG. 17. By shutting down the I/O drawer as a whole, all the blocks 1712-1724 in FIG. 17 are eliminated resulting in a greater energy saving.

With reference to FIG. 19, this figure depicts a graph of a resource allocation in a partitioned data processing environment in which an illustrative embodiment can be implemented. The types of partitions depicted along the X-axis in graph 1900 may be each be a data processing system according to data processing system 100 in FIG. 1. As an example, the resource depicted along the Y-axis in graph 1900 may be energy.

In a partitioned data processing environment, a partition may be designated a capped partition or an uncapped partition or a certain computing resource, including energy. A capped partition is a partition whose demand for a particular resource is limited to a set amount of the resource, but the partition is guaranteed availability of that amount of the resource when the partition needs the resource.

An uncapped partition is a partition whose demand for a particular resource can vary from zero to a threshold amount of the resource, provided the resource is available. In some cases, the threshold amount can be one hundred percent of the resource. An uncapped partition is not guaranteed the amount of resource the partition may require at any given time, but may receive the amount of resource if that amount of resource is available at the time of the requirement.

Capped partitions 1902 is a set of capped partitions are described above. Uncapped partitions 1904 is a set of uncapped partitions as described above. A set of capped partitions is one or more capped partition. A set of uncapped partition is one or more uncapped partition.

Cap level 1906 is an amount of a resource, such as energy, that is guaranteed to be available to capped partitions. Cap level 1906 is usually less than one hundred percent of the resource.

Block 1908 represents guaranteed availability of the resource to capped partitions 1902 up to cap level 1906. Block 1910 represents availability of the resource to uncapped partitions 1904 up to a threshold amount of the resource, according to the amount of resource that may be available for allocation. As an example, the threshold amount of resources that can be made available on an "as available" basis to uncapped partitions is one hundred percent.

Figure 20:
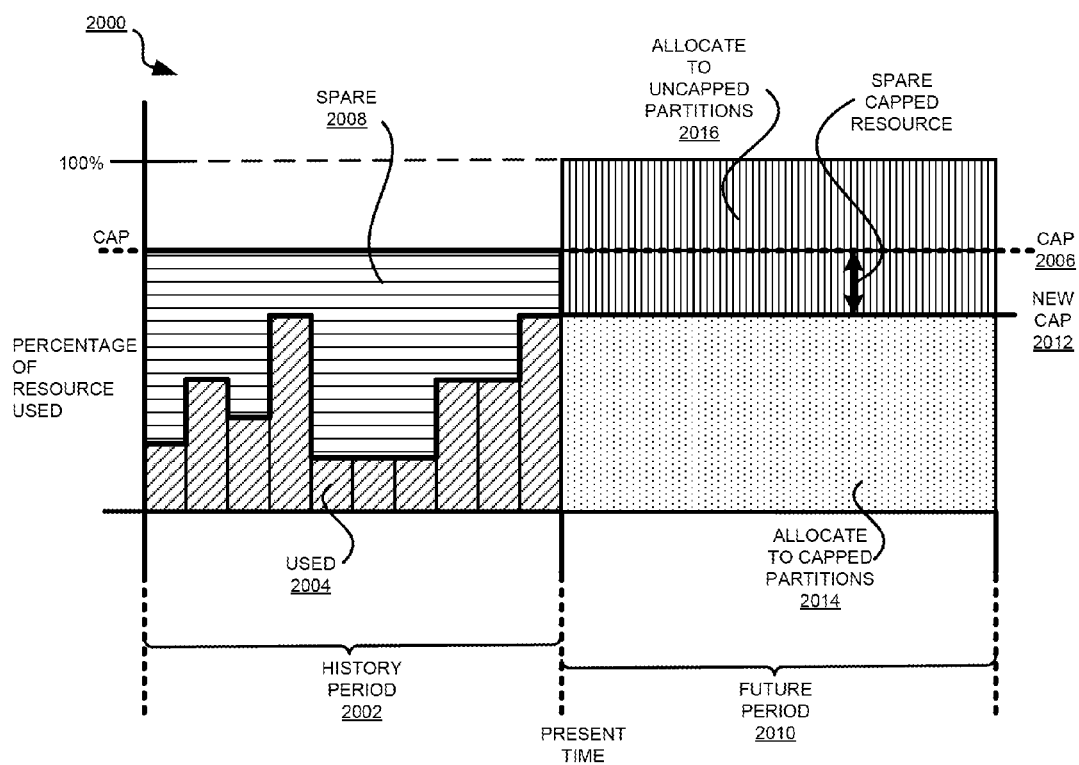
FIG. 20 depicts a graph of resource re-allocation in accordance with an illustrative embodiment.

With reference to FIG. 20, this figure depicts a graph of resource re-allocation in accordance with an illustrative embodiment. Using energy as a resource for example, as described with respect to some illustrative embodiments in this disclosure, energy may be conserved without adversely affecting performance by selectively operating certain components of a given data processing system. As a result of such selective operation, the invention recognizes that some energy that may have been allocated to a capped partition may become available for reallocating to uncapped partitions. In some other circumstances, a capped partition may simply not use up to the capped amount of a resource.

The unused and saved amounts of the resource are collectively called spare resource. If such spare resource is reallocated to the uncapped partitions, the uncapped partitions may be able to provide improved performance, increased throughput, better user experience, and other similar improvements, as compared to the same aspects of the uncapped partitions without the spare amount of the resource.

Other resources may also be similarly conserved by using the invention or other methods. Any saved resource can then be reallocated as described in this disclosure. Graph 2000 describes a way of performing the reallocation of a spare amount of a resource in accordance with an illustrative embodiment.

A dispatcher of resources to capped and uncapped partitions, such as a Hypervisor, may observe the resource consumption pattern of capped partitions over history period 2002. Used area 2004 of graph 2000 represents usage by a set of capped partitions of the amount of resource depicted along the Y-axis of graph 2000. Cap level 2006 represents the guaranteed amount of the resource to the set of capped partitions during history period 2002.

A component of the dispatcher according to an embodiment of the invention cumulatively computes spare amount of resource 2008 over history period 2002. The component can readily be implemented in hardware, software, or a combination thereof, for performing the functions according to the illustrative embodiments.

The component computes an amount of resource that is likely to be needed by the set of capped partitions over future period 2010 that is similar to history period 2002. In effect, the component forecasts the amount of resource that the set of capped partitions are likely to need for performing comparably in future period 2010 as during history period 2002.

The component may evaluate that the set of capped partitions may be able to perform with new cap level 2012 of resources. When spare amount of resource 2008 is a positive area in graph 2000, new cap level 2012 may be less than cap level 2006.

The dispatcher, using this evaluation from the component, may allocate to the set of capped partitions an amount of resource for future period 2010 as depicted by area 2014. The dispatcher may then allocate to a set of uncapped partitions an amount of resource for all or part of future period 2010 as depicted by area 2016.

In some cases, area 2016 may an increased allocation of the resource to the set of uncapped partitions for only a portion of future period 2010. The reduction in this period of increased allocation may depend on spare resource 2008 that may be available for certain periods. Furthermore, the dispatcher may allocate part of the amount of the resource represented by area 2016 unevenly depending on weighting of the uncapped partitions in the set of partitions.

With reference to FIG. 21, this figure depicts a graph of weighted allocation of spare resources in accordance with an illustrative embodiment. Blocks 2102 and 2104 together may be analogous to area 2016 in FIG. 20. Block 2102 may be equal to amount of spare resource 2008 in FIG. 20.

As an example, each uncapped partition in the set of uncapped partitions may be assigned a weight. For example, on a scale of 1-100, uncapped partition 1 may be assigned a weight of 50. Similarly, uncapped partition 2 may be assigned a weight of 25, uncapped partition 3 may be assigned a weight of 25, and uncapped partition 4 may be assigned a weight of 50. Each uncapped partition may be assigned any weight value on any scale of choice without limitation. Furthermore, any one weight can have a value up to but not exceeding the maximum value on the selected scale, However, the total of all weights need not be equal to the maximum value on the selected scale.

Based on the example weights of the four partitions above, the dispatcher may allocate proportional amounts of resource from block 2102 to those uncapped partitions. For example, assume that one kilowatt-hour (kWH) of energy was represented in block 2102 as the spare energy. The dispatcher may allocate, according to their respective weights, (1\*50)/(50+25+25+50) kWH to uncapped partition 1, area 2106 corresponding to this example fraction of block 2102;

(1\*25)/(50+25+25+50) kWH to uncapped partition 2, area 2108 corresponding to this example fraction of block 2102;

(1\*25)/(50+25+25+50) kWH to uncapped partition 3, area 2110 corresponding to this example fraction of block 2102; and (1\*50)/(50+25+25+50) kWH to uncapped partition 4, area 2112 corresponding to this example fraction of block 2102.

The amount of resource corresponding to area 2104 may remain available to any uncapped partition in the set of uncapped partitions as they may need the resource.

In case of the energy resource, because blocks 2106-2112 represent spare energy, they may be allocated to the various uncapped partitions for different time durations. For example, uncapped partition 1 may receive the amount of spare energy equivalent of block 2106 at higher amperage than a threshold but for shorter time than a threshold. Similarly, uncapped partition 2 may receive the amount of spare energy equivalent of block 2108 at lower amperage than the threshold amperage but for longer time than the threshold time. Similarly, uncapped partition 3 may receive the amount of spare energy equivalent of block 2110 at the threshold amperage and for the threshold time. Similarly, uncapped partition 4 may receive the amount of spare energy equivalent of block 2112 at higher amperage than the threshold amperage but for shorter time than the threshold time. Allocation duration, as described in this example, is also called a time slice.

Figure 22:
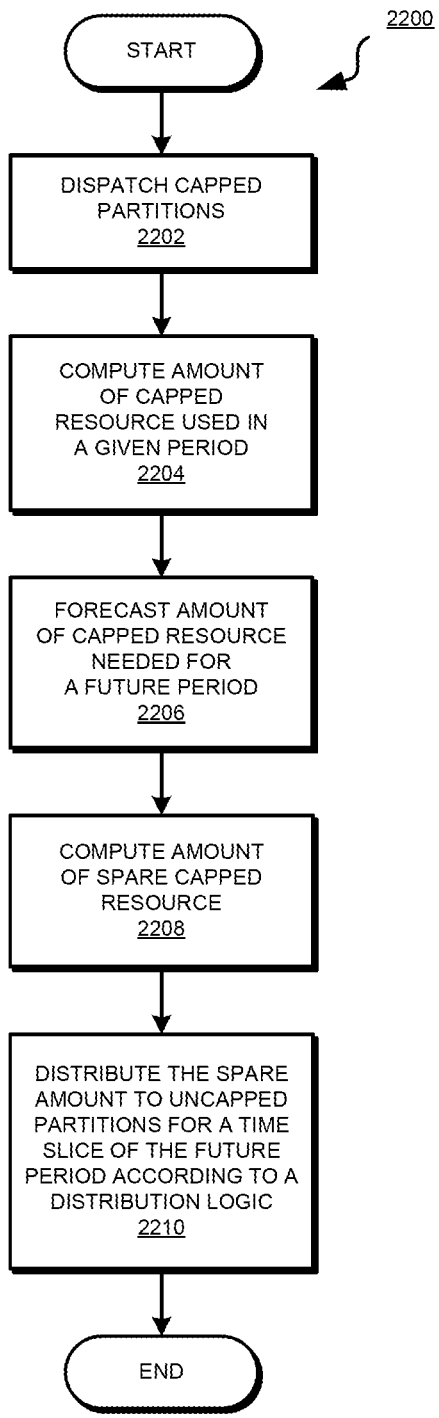
FIG. 22 depicts a flowchart of a process of allocating spare resource in accordance with an illustrative embodiment.

With reference to FIG. 22, this figure depicts a flowchart of a process of allocating spare resource in accordance with an illustrative embodiment. process 2200 may be implemented in a dispatcher, such as a Hypervisor.

Process 2200 begins by dispatching the predetermined capped portion of the amount of the resource to the set of capped partitions (step 2202). Process 2200 computes an amount of capped resource used in a given period (step 2204).

Process 2200 forecasts an amount of capped resource that will be needed for a future period (step 2206). Process 2200 computes an amount of spare capped resource that will be available in the future period (step 2208).

Process 2200 distributes the spare capped resource to uncapped partitions for a time slice of the future period according to a distribution logic (step 2210). Process 2200 ends thereafter.

In one embodiment, the distribution logic may employ weighting of the uncapped partitions as described above. Other embodiments may employ any logic for distributing the spare capped resource. For example, one distribution logic may be to always distribute equally to all uncapped partitions. Another distribution logic may be to always distribute equally to some uncapped partitions and no distribution of spare capped resource to some other uncapped partitions. Within the scope of the invention, distribution logic may employ rules embodying certain computations and logic conclusions to determine distribution of the spare capped resource as well as the amount of resource represented as block 2104 in FIG. 21.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for scaling energy use in a illustrative embodiments in a virtualized data processing environment, a data processing environment can conserve energy by powering off certain PIOAs and transferring their workload to other PIOAs without adversely affecting performance. Powering down PIOAs and transferring workload in the manner of the invention increases utilization of the operational PIOAs while reducing the overall energy consumption.

Using the embodiments of the invention, the data processing environment can also distribute spare energy resource to certain other data processing systems. In so redistributing, the data processing systems that spare the resource remain unaffected by the donation, and the data processing systems that receive the spare resource can show improved performance.

The invention can take the form of an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable storage device providing program code for use by or in connection with a computer or any instruction execution system. For the purposes of this description, a computer-usable or computer-readable storage device can be any tangible apparatus that can contain or store the program for use by or in connection with the instruction execution system, apparatus, or device.

The storage device can be an electronic, magnetic, optical, electromagnetic or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer usable storage device may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage device that are computer usable, such as being computer readable. A data storage device associated with a server data processing system may contain computer usable code. A client data processing system may download that computer usable code, such as for storing on a data storage device associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner. The terms "computer usable storage device" and variations thereof do not encompass a signal propagation medium such as a copper cable, optical fiber, or wireless transmission medium, any description in this disclosure to the contrary notwithstanding.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:
1. A computer implemented method comprising:
  dispatching a first amount of a resource to a set of capped partitions, a partition being a data processing system in a virtualized data processing environment;
  computing, using a processor and a memory, a used portion of the first amount used in a first period;

forecasting a second amount of the resource needed for a second period, the forecasting being based on (i) the used portion of the first amount and (ii) a workload performed by the set of capped partitions in the first period;

computing a spare portion of the first amount in the first period;

allocating the second amount to the set of capped partitions in the second period; and distributing a third amount of the resource to a set of uncapped partitions, the third amount being equal to the spare portion of the first amount.

2. The computer implemented method of claim 1, where the distributing further comprises:

allocating the third amount to a subset of the set of uncapped partitions according to a distribution criterion associated with each uncapped partition of the subset of the uncapped partitions.

3. The computer implemented method of claim 2, wherein the distribution criterion is a weight value on a selected scale.

4. The computer implemented method of claim 2, wherein the allocating the third amount to an uncapped partition in the subset further comprises:

allocating a portion of the third amount for a portion of the second period.

5. The computer implemented method of claim 1, further comprising:

allocating a fourth amount of the resource to the uncapped partitions in the set of uncapped partitions, the fourth amount being allocable to any uncapped partition in the set of uncapped partitions as needed by the uncapped partition during the second period.

6. A computer usable program product comprising a computer usable storage device including computer usable code, the computer usable code comprising:

computer usable code, stored on the computer usable storage device and when executed by a processor causing dispatching a first amount of a resource to a set of capped partitions, a partition being a data processing system in a virtualized data processing environment;

computer usable code stored on the computer usable storage device and when executed by the processor causing computing a used portion of the first amount used in a first period;

computer usable code stored on the computer usable storage device and when executed by the processor causing forecasting a second amount of the resource needed for a second period, the forecasting being based on (i) the used portion of the first amount and (ii) a workload performed by the set of capped partitions in the first period;

computer usable code stored on the computer usable storage device and when executed by the processor causing computing a spare portion of the first amount in the first period;

computer usable code stored on the computer usable storage device and when executed by the processor causing allocating the second amount to the set of capped partitions in the second period; and computer usable code stored on the computer usable storage device and when executed by the processor causing distributing a third amount of the resource to a set of uncapped partitions, the third amount being equal to the spare portion of the first amount.

7. The computer usable program product of claim 6, where the computer usable code for distributing further comprises:

computer usable code stored on the computer usable storage device and when executed by the processor causing allocating the third amount to a subset of the set of uncapped partitions according to a distribution criterion associated with each uncapped partition of the subset of the uncapped partitions.

8. The computer usable program product of claim 7, wherein the distribution criterion is a weight value on a selected scale.

9. The computer usable program product of claim 7, wherein the allocating the third amount to an uncapped partition in the subset further comprises:

allocating a portion of the third amount for a portion of the second period.

10. The computer usable program product of claim 6, further comprising:

computer usable code stored on the computer usable storage device and when executed by the processor causing allocating a fourth amount of the resource to the uncapped partitions in the set of uncapped partitions, the fourth amount being allocable to any uncapped partition in the set of uncapped partitions as needed by the uncapped partition during the second period.

* * * * *